United States Patent
Greenberg et al.

(10) Patent No.: US 12,360,064 B1
(45) Date of Patent: Jul. 15, 2025

(54) METHOD FOR CAPTURE OF SMALL-ANGLE SCATTER OVER WIDE FIELDS OF VIEW

(71) Applicants: Quadridox, Inc., Hillsborough, NC (US); Duke University, Durham, NC (US)

(72) Inventors: Joel Alter Greenberg, Durahm, NC (US); Michael Eric Gehm, Hillsborough, NC (US); Anuj Jawahar Kapadia, Knoxville, TN (US); David Scott Coccarelli, Chapel Hill, NC (US)

(73) Assignees: Quadridox, Inc., Hillsborough, NC (US); Duke University, Durham, NC (US)

( * ) Notice: Subject to any disclaimer, the term of this patent is extended or adjusted under 35 U.S.C. 154(b) by 0 days.

(21) Appl. No.: 19/066,471

(22) Filed: Feb. 28, 2025

Related U.S. Application Data

(63) Continuation of application No. PCT/US2024/019390, filed on Mar. 11, 2024.
(Continued)

(51) Int. Cl.
  *G01N 23/00* (2006.01)
  *G01N 23/046* (2018.01)
  (Continued)

(52) U.S. Cl.
  CPC ......... *G01N 23/201* (2013.01); *G01N 23/046* (2013.01); *G01N 23/20025* (2013.01); *G01N 2223/401* (2013.01); *G01N 2223/601* (2013.01)

(58) Field of Classification Search
  CPC .... G01N 23/046; G01N 23/083; G01N 23/20; G01N 2223/063; G01N 2223/419;
  (Continued)

(56) References Cited

U.S. PATENT DOCUMENTS

| | | |
|---|---|---|
| 5,600,700 A | 2/1997 | Krug |
| 6,118,850 A | 9/2000 | Mayo |
| (Continued) | | |

FOREIGN PATENT DOCUMENTS

| | | |
|---|---|---|
| EP | 0808468 B1 | 11/1997 |
| EP | 2798339 B1 | 10/2017 |

OTHER PUBLICATIONS

Park, Tae Wook, Written Opinion of the International Searching Authority for International application No. PCT/US2024/019390, Jul. 12, 2024, 10 pages, Korean Intellectual Property Office, Daejeon, South Korea.
(Continued)

*Primary Examiner* — Dani Fox
(74) *Attorney, Agent, or Firm* — Kevin E Flynn; FLYNN IP LAW

(57) ABSTRACT

Estimate material coherent scatter form factors for voxels within a scan object by exposing a series of slices of the scan object to an X-ray fan beam within a coherent scatter scanner. Capturing coherent scatter data at a least two X-ray detector modules that are limited to a small-angle field of view by at least one detector-side angle limiting element to provide for capture of small-angle scatter over a wide field of view. Combining the coherent scatter data from the at least two X-ray detector modules to generate an aggregated collection of estimated material coherent scatter form factors for at least some voxels. Combining the aggregated collection of estimated material coherent scatter form factors with a model of aggregate items that clusters voxels in the scan object into model items. Using the aggregated collection of estimated material coherent scatter form factors to estimate a material type for individual model items.

19 Claims, 18 Drawing Sheets

Related U.S. Application Data

(60) Provisional application No. 63/451,584, filed on Mar. 11, 2023.

(51) Int. Cl.
  *G01N 23/20025* (2018.01)
  *G01N 23/201* (2018.01)

(58) Field of Classification Search
  CPC .... G01N 2223/423; G01V 5/222; G01V 5/22; G01T 11/005; G06T 2207/10081; G06T 2211/408; G06T 2211/416
  See application file for complete search history.

(56) References Cited

U.S. PATENT DOCUMENTS

| | | | |
|---|---|---|---|
| 6,392,235 | B1 | 5/2002 | Barrett |
| 7,065,175 | B2 | 6/2006 | Green |
| 7,606,348 | B2 * | 10/2009 | Foland ................. G01N 23/046 378/57 |
| 7,646,850 | B2 | 1/2010 | MacDonald |
| 7,835,495 | B2 | 11/2010 | Harding |
| 7,856,081 | B2 | 12/2010 | Peschmann |
| 8,135,110 | B2 | 3/2012 | Morton |
| 8,674,706 | B2 | 3/2014 | Peschmann |
| 9,335,281 | B2 | 5/2016 | Marks |
| 9,686,479 | B2 | 6/2017 | Marks |
| 9,865,066 | B2 | 1/2018 | Bedford |
| 9,915,752 | B2 | 3/2018 | Peschmann |
| 10,004,464 | B2 | 6/2018 | Brady |
| 10,107,768 | B2 | 10/2018 | Brady |
| 10,121,561 | B2 | 11/2018 | Marticke |
| 10,371,651 | B2 | 8/2019 | Barbes |
| 10,462,343 | B2 | 10/2019 | McCain |
| 10,466,183 | B2 | 11/2019 | Seetho |
| 10,477,137 | B2 | 11/2019 | Brady |
| 10,591,424 | B2 | 3/2020 | Morton |
| 10,605,749 | B2 | 3/2020 | Paulus |
| 11,058,369 | B2 | 7/2021 | Biju |
| 11,399,788 | B2 | 8/2022 | Greenberg |
| 2006/0104414 | A1* | 5/2006 | Mayo ..................... G01V 5/222 378/57 |
| 2008/0175350 | A1 | 7/2008 | MacDonald |
| 2009/0010386 | A1 | 1/2009 | Peschmann |
| 2016/0187269 | A1 | 6/2016 | Brady |
| 2018/0038988 | A1 | 2/2018 | Morton |
| 2018/0120241 | A1* | 5/2018 | Seetho ................. G06T 11/005 |
| 2020/0225371 | A1 | 7/2020 | Greenberg |

OTHER PUBLICATIONS

Park, Tae Wook, International Search Report of the International Searching Authority for International application No. PCT/US2024/019390, Jul. 12, 2024, 7 pages, Korean Intellectual Property Office, Daejeon, South Korea.

Greenberg, Joel, X-Ray Diffraction Imaging—Technology and Applications, 2019, 53 pages for Chapter 1, CRC Press/Taylor Francis Group, Boca Raton, Florida, United States of America.

Kern, Katie et al., Design for a coherent-scatter imaging system compatible with screening mammography, Journal of Medical Imaging, Jul. Sep. 2016 issue, 5 pages, SPIE, Bellingham, Washington, United States of America.

Skatter, Sondre et al., Detecting Liquid Threats with X-ray Diffraction Imaging (XDi) using a Hybrid Approach to Navigate Trade-offs between Photon Count Statistics and Spatial Resolution, Anomaly Detection and Imaging with X-Rays (ADIX), 2016, 14 pages, SPIE, Bellingham, Washington, United States of America.

Zhu, Zheyuan, Katsevich, Alexandra, Kapadia, Anuj J., Greenberg, Joel A., Pang, Shuo, X-ray diffraction tomography with limited projection information, Scientific Reports, (www.nature.com/scientificreports), Jan. 11, 2018, 6 pages, Nature Portfolio, London, England.

* cited by examiner

METHOD FOR CAPTURE OF SMALL-ANGLE SCATTER OVER WIDE FIELDS OF VIEW

This application claims priority to co-pending and commonly assigned PCT application PCT/US2024/019390 filed Mar. 11, 2024 for Method for Capture of Small-Angle Scatter Over Wide Fields of View. The '390 application claims the benefit of then U.S. Provisional Application No. 63/451,584 for System and Method for Modular Radiation Scatter Analysis filed Mar. 11, 2023. The '390 application and the '584 application are both incorporated in their entireties herein.

This invention was made with Government support under 70RSAT18CB0000044 awarded by the United States Department of Homeland Security Science and Technology Directorate (DHS-S&T). The United States government has certain rights in the invention.

BACKGROUND

Field of the Disclosure

The present disclosure relates to radiation imaging, and more specifically, to radiation scatter analysis.

Background Information

The use of radiation scatter analysis using X-rays is not new. This application claims the benefit of an earlier filed provisional application that explained the innovations to one of skill in the art. As not everyone is already one of skill in the art in this space, it is useful to introduce some basic concepts so that a broader audience can appreciate the additions to the field made in this disclosure.

An X-ray source sends out X-rays in all directions. The prior art has developed various ways to limit the egress directions of the X-rays so that the X-rays can be limited to coming out in a pencil beam, a cone, or in a single plane of a cone which is called a fan beam.

Just as a computer screen can be thought of as a X-Y array of pixels, a volume can be described as the three-dimensional version of pixels-voxels. Thus, every X,Y,Z coordinate within a volume would have a unique voxel. In various scanning methods, the characteristics of each voxel are measured and a spatially contiguous set of voxels having the same properties are assumed to be one common object such as a bar of soap in a suitcase or the heel of a shoe.

When X-rays hits a voxel, some X-rays pass through the voxel. Thus, X-ray detector modules for scatter analysis are not placed directly in line with the X-ray beams as those direct X-rays would blind the X-ray detector module to other more interesting X-rays. The X-rays of interest are those that have been deflected, or scattered, after interacting with the voxel. It turns out that different materials tend to deflect X-rays in different, repeatable ways. In this context, the term material means a combination of different properties including chemical composition, crystallinity, mixture compositions, and other features. For X-rays hitting a crystalline material such as a diamond, the deflections are quite repeatable and form outgoing concentric cones aligned on the original direction of the X-ray. For X-rays hitting non-crystalline material there are still distinct patterns but they tend to be more of a series of peaks and valleys that are rounded and not nearly as sharp as the series of lines that one would get from proper positioning of a detector module to capture the series of concentric cones from a crystalline material. But the patterns are distinctive for each material none the less.

The type of interaction of interest in this disclosure is coherent X-ray scatter, sometimes subdivided into small-angle X-ray scatter, which is often abbreviated as SAXS, and wide-angle X-ray scatter, which is often abbreviated as WAXS. SAXS and WAXS are also called coherent scatter. Coherent scatter is also referred to as X-ray diffraction, especially in the case when the scattering material has some degree of crystallinity. This disclosure will use coherent scatter as some prefer to limit diffraction to the specific scattering of crystalline materials.

There is another type of X-ray scatter that arises over a much broader range of deflection angles than coherent scatter, and this Compton large-angle scatter is not being used here and will be filtered out as described later. Frequently collecting only small angle (less than approximately 15 degrees) X-ray scatter allows collection of the useful information from coherent scatter without the noise from large-angle scatter such as Compton large-angle scatter and other noise sources.

A problem with limiting the collection of X-ray scatter to small angles is this small-angle view conflicts with a desire to scan wide portions of the object being scanned.

How severely does the X-ray deviate when making contact? That is a function of two things. The distance between the voxel being hit with the X-ray and the detector module is one variable. Thus, a detector module ten inches above the point of impact with the voxel would see a tighter pattern of deflections than a detector module positioned twenty inches above the point of impact with the voxel as the cone grows larger as the X-rays continue to deviate from the centerline of the cone. The second variable is that X-rays come with different energies. The energy levels are measured in electron volts (eV, often considered in the range of kilo-electron volts or keV). An X-ray with an energy level of a first value of keV will bend less from the straight path of the X-rays (have a tighter cone) than an X-ray with a lower energy level.

Fortunately, the differences in the amount of bending are proportional to the energy levels so it is common to give the family of bending angles and energy levels a single value q. The concept q is understood as the momentum transferred to the X-ray during coherent scatter, and the exact relationship between energy and deflection angle is described by Bragg's law.

Thus, the shape of the cones of radiation deviating from the straight-line path of X-rays after hitting a voxel of material is a function of the material in the voxel and the energy level of the X-ray. What is seen at a detector module is also impacted by the distance between the detector module and the voxel hit by the X-ray.

FIG. 1.

To help one visualize these fundamental concepts, FIG. 1 may be useful. In FIG. 1 we are looking at a X-Z plane with the Y dimension extending into and out of the figure. An X-ray fan beam 12 that is in the Y-Z plane appears as straight line. A first item appears at voxel 14. Some of the X-rays that hit the item at location are deflected a set amount in all directions to form a cone 24 and some other X-rays are deflected a greater amount to form cone 28. As we are looking at a plane X-Z, we see these cones are pairs of lines where the cone intersects with this plane. As the deflected X-rays move in the Z direction, they hit an X-ray detector module 50 that is a rectangle in the X-Y plane and thus we only see a line looking at the side. Notice that the undeflected X-rays in the fan beam 12 do not hit the detector module 50.

If the energy level on the X-ray fan beam is reduced, then the X-rays hitting the same material at voxel 14 would have two larger cones, 34 and 38 as the cones all have the same q value and that means that the angle of deflection is proportional to the energy level of the X-ray. Notice that deflection cone 38 totally misses the detector module plate.

Now if the voxel being hit with the X-ray beam was much closer to the detector module, then the spread of the cones would be smaller. Voxel 18 which is above voxel 14 and made of the same material as found at voxel 14 would coherently scatter X-rays at the original energy level used for cones 24 and 28 the same angles as 24 and 28 but cones 44 and 48 have less distance to deviate and thus hit the detector module 50 at different locations than do cones 24 and 28.

FIG. 2.

FIG. 2 shows the same fan beam 12 of X-rays at the first energy level at voxel 18 there is the same material as was in FIG. 1 so the scatter cones 44 and 48 are the same as FIG. 1. In FIG. 2, there is a voxel at location 16 that is made of a different material than that found at voxel 18 so the q value is different, and the scatter cones are different. These cones 44 and 48 have smaller angles of deflection than for the material found at voxel 18. To help illustrate a point, they happen to deflect such that the cones 44 and 48 hit the detector module 50 at the same places as do cones 44 and 48 as for purposes of this example, the differences in the amount of deflection angles and the differences in distance from the detector module 50 offset one another.

These figures oversimplify as the deflections of the X-rays will not be pure cones but will be distributions of deflections that will have peak intensities at the locations shown by cones 24, 28, 34, 38, 44, and 48. However, FIG. 1 and FIG. 2 have served the purpose of introducing that X-ray deflection is a function of:

The material in the voxel being struck by the X-ray beam as each material has a unique pattern of scatter. For example, the pattern for stainless steel is different than the pattern for a rubber heel for a shoe.

The distance of the X-ray detector module from the voxel being struck as the greater the distance the more deviation of the X-rays from the original path of the X-ray.

The energy level of the X-ray beam as differences in energy level will vary the angles of the cones in the q family with higher energy level X-ray beams deviating less than lower energy X-ray beams.

Fortunately, spectroscopic (sometimes called energy-resolving) X-ray detector modules exist that capture the energy level of the X-ray hitting the detector. Thus, for each arrival of an X-ray at the X-ray detector module, the X-ray detector module collects a set of information including:

The X-Y location of the specific detector that noted the scattered X-ray. Obtained as the detectors are pixelated in both the X and Y directions. Note-one of skill in the art could replace these two-dimensional X-ray detectors with an array of linear, 1D detectors.

The arrival time of the coherently scattered X-ray so that this can be mapped to the location of the fan beam within the scanned object.

The energy of the coherently scattered X-ray. This allows the data for a certain X-ray energy to be combined and analyzed separately from data collected from other energies so that the concurrent receipt of many different X-rays at different energies does not muddle the data. When looking at data at a specific energy level, patterns in the X-Y positions of detectors receiving coherently scattered X-rays at the same time will suggest the shape of arcs which would suggest the possible q levels of struck objects that generated the set of coherently scattered X-rays in response to X-rays from the fan beam.

Scanner Types

Within the field of X-ray scatter, there are two groups of solutions. The group of relevance here is the group that uses an immobile X-ray source to form beams of X-rays that strike an object to be scanned and the X-rays are detected by immobile X-ray detector modules after the interaction with the scanned object.

There are other types of scanner solutions that have X-ray sources and X-ray detector modules that move relative to the scanned object. In some solutions, the X-ray source is immovable, but the X-ray detector module moves relative to the scanned object. In either case, the movement provides the opportunity for a great deal more information to be gathered and processed. The problems with minimizing the impact of blind spots in immobile source/detector systems discussed below are much less likely to be important to the design of such dynamic source/detector systems.

Collimator

Another tool in the toolkit for X-ray scatter equipment is a collimator. A collimator is a metallic structure with openings just as a coded aperture. The difference is that a coded aperture is relatively thin so the openings in the coded aperture pass X-rays that are coming at almost any angle as just about any X-ray that gets into an opening of the coded aperture will go to the exit of that same opening as there is not an opportunity to hit the wall of the very thin coded aperture and get absorbed by the wall.

A collimator, in contrast, has openings with elongated passages from one side to the other. Depending on the size of the opening and the length of the passageway, the X-ray beam may need to be almost perfectly aligned with the centerline of the passageway. If the opening is made larger or the length of the passageway is made shorter, then a somewhat broader range of non-aligned X-rays will traverse the passageway without hitting a wall and getting absorbed. However, the range of angles that can pass through the collimator are very limited such that the X-rays will need to be travelling substantially parallel with the center line of the collimator passageway.

Coherent Scattering.

When an X-ray hits a piece of material at a voxel, several different things happen. One thing that happens is that some X-rays cause Coherent Scattering. This is sometimes also called Elastic Scattering or Rayleigh Scattering. The X-ray interacts with the electron cloud and leaves at a different angle. The X-ray leaves at the same energy as when it entered the voxel. Some people refer to the original X-ray beam (pencil, fan, cone, et cetera) to be the primary beam. As X-rays move from a struck object in new directions, this is often referred to as a secondary beam. Thus, a primary beam that is a fan beam may strike many objects and create many conical secondary beams via coherent scattering.

Compton Large-Angle Scatter.

A second type of interaction when an X-ray hits material at a voxel is that the interaction of the X-ray and the material leaves some energy with the material but there is an X-ray emission that leaves the voxel. This disclosure works to filter out the Compton large-angle scatter as noise and does not use the Compton large-angle scatter process to help characterize the material at a particular voxel. Multiple scatter in which an X-ray undergoes more than one scattering event (consisting of Compton and/or coherent scatter) also generates scattered X-rays at a large range of angles and can be considered as noise.

X-Ray Sources.

X-ray tubes release X-rays at many different energy levels (broadband or polychromatic). This is in contrast to specialty sources like X-ray lasers or synchrotrons that emit just one energy level (mono energetic). The teachings of this disclosure do not require the use of mono energetic sources. One way to work with a broadband source is to run the output through a filter to narrow the spectrum of energy levels (generating partially monochromatic X-ray radiation) so that the X-rays received at an X-ray detector module are easier to interpret as coming from a particular q level at a particular voxel. While often the filter only removes X-rays below a certain energy level, filters may be used to limit the X-ray energy levels to a band between a minimum level and an upper level.

Another option is to use special X-ray detector modules that identify the energy level of the X-ray that is received. This allows the detector to correct for differences in energy levels of the X-rays that would result in different absolute angle deviations for a given q level.

FIG. 3.

FIG. 3 shows a set of components to help illustrate additional concepts. In FIG. 3 a broadband X-ray source 10 releases X-rays. The X-rays pass through an opening between plates to change the spread of X-rays to make it a fan beam 12. The right and left sides of the fan beam 12 are shown. The scan object 70 that is being scanned may be a suitcase that is proceeding on a belt in a scanning tunnel. The fan beam 12 scans a portion of the suitcase as there are portions of the X-Z plane that are not within the path of the fan beam 12. As the suitcase travels in the Y direction down the belt in the tunnel, different Y slices of the suitcase get scanned.

A source side series of coded apertures 64 can be placed between the source 10 and scan object 70 being scanned. The series of coded apertures 64 are in the X-Y planes. The cross sections in the X-Z plane reveal a series of solid portions and openings in this particular Y slice of the set of coded apertures. The one or more coded apertures 64 or a set of collimators (not shown here) can be used to limit the X-rays that enter the scan object 70. This can reduce the complexity of interpreting the data generated by the set of two-dimensional X-ray detector modules (50, 52, 54, and 56). As previously noted, the two-dimensional X-ray detector modules (50, 52, 54, and 56) are not in the same plane as the fan beam 12 so that X-rays from the fan beam 12 that are not deflected do not hit the X-ray detector modules (50, 52, 54, and 56). As the X-rays strike items at different voxels within the scanned portion of the scan object 70, some X-rays scatter and this scatter can be used to assess the type of material found at the particular voxel.

Without a detector module side set of coded apertures 68 or collimators (not shown here) the X-ray detector modules will be subject to receiving X-rays (80, 82, 84, and 86) from a wide variety of angles. The use of nearly impermeable metal barriers that have limited pathways for X-ray movement will greatly reduce the number of X-rays that reach the detector module. By way of illustration, X-rays 80, 82, and 84 would have been absorbed by the X-ray absorbing material of the set of detector side coded apertures 68.

One of skill in the art will appreciate that FIG. 3 is just a teaching tool as at any moment a great number of X-rays would be hitting items at various X-Z locations in the scan object 70 and a great number of scatter events and pass through movement of X-rays would be happening at the same time.

FIG. 4.

FIG. 4 is a different representation of the key components in an X-ray scatter detection system. The X-rays emitted by source 10 are shaped by plates 78 to form a fan beam 12. Note that other beam forming arrangements may form a pencil beam, a cone, or some other shape. The fan beam interrogates at least a portion of an X-Z slice of a scan object (70 in FIG. 3) of interest such as a suitcase moving along a belt in the Y direction in a tunnel.

FIG. 5.

FIG. 5 is a view much like FIG. 4 but provides additional context. The X, Y, and Z axes are in millimeters. A fan beam 12 passes through a portion of a X-Z slice of a scan object 70 such as a suitcase moving in the Y direction on a belt in a tunnel. A detector side coded aperture 68 is used to provide post object filtering of the X-rays. Note that the edge of the fan beam 12 does not contact the X-ray detector module 50.

FIG. 6.

FIG. 6 shows a series of computer model images for scans of a scan object 70 such as a suitcase. As this is a computer model, the model could opt to only show the interaction of the detector module 50 with coherent scatter. Those of skill in the art will appreciate that in a collection of actual data by a detector module 50 the coherent scatter would be overlaid by Compton scatter and other sources of noise.

The units on these image graphs are voxels which is a unit used in the model and would be proportionate to the size voxel requested for the model. The X-Z slice of the scan object is approximately 55 by 40 voxels (corresponding to roughly 40×60 cm). This corresponds to voxel sizes of 7 mm by 15 mm on a side. As discussed in connection with FIG. 1 and FIG. 2 the X-ray detector module 50 is offset from the X-rays such as fan beam 12 in FIG. 5. The cones of coherently scattered X-rays that hit an X-ray detector module 50 above and shifted in the Y direction from the fan beam 12 will be a function of several variables.

- The distance of the X-ray detector module above the tunnel and the Z location of the interrogated voxel within the scan object 70. As the distance increases, some coherently scattered X-rays that would have passed in the gap between the fan beam 12 and the detector module 50 have enough distance to hit the X-ray detector module. But some X-rays that were deflected a greater amount (greater q value) would now have travelled laterally sufficiently to miss the X-ray detector module 50.
- The q value for the scatter. Some materials deflect a family of responses to X-rays of different energy values different amounts. That is why X-ray scatter is useful in predicting what particular material is at a particular voxel in the scanned scan object 70. Those of skill in the art will see the graphs for low q values such as q=−0.05 and understand that voxels towards the upper end of the graph do not provide coherent scatter to the detector module 50 as the low q value indicates small angles of scatter and the coherent scatter from high in the scan object would fall in the dead space between the fan beam 12 and the X-ray detector module 50.
- The energy of the X-ray. As the energy is increased, the amount of scatter and thus the size of the cone at a particular distance decreases. Conversely, decreasing the energy of the X-rays will increase the amount of deflection and make the cones of deflection wider.

Thus, one of skill in the art will appreciate that the set of graphs for scanned area as a function of the q value for a particular material is highly dependent on the energy level used and the geometry of the X-ray scatter system. FIG. 6 illustrates that the portion of the scan object 70 that is actually evaluated will vary for a given q/energy level couplet. As indicated by the model data in FIG. 6, the conventional solution leads to at least partial q-blindness to many of the voxels in the X-Z plane of a particular value of Y for a suitcase or other scan object 70 moving in the Y-direction through a fan beam 12.

More specifically, the areas of white are not receiving any X-rays from coherent scatter. The areas that are cross-hatched are receiving at least some coherent scatter. A color-coded graph would reveal that some areas are receiving much more coherent scatter than others but this graph is black and white in order to comply with the rules of some patent systems. The original, colored output graphs filed with the above-identified United States provisional application will be available from the United States Patent and Trademark Office after this application has published.

As many materials cause scattering of X-rays that have several bands of peak X-ray deflection for a given energy value of the X-ray, the material can be said to have a distribution over q values. To properly characterize a material, it would be best to have visibility of a particular voxel for each of the predominant q values.

Vocabulary

A, An.

In this application, and the claims that follow, the terms a, an, or the identification of a single thing should be read as at least one unless such an interpretation is impossible within the context of the entirety of the specification. For example, the use of the terms sole, only, or the phrase not more than one would indicate that a single item is intended.

Estimated Material Coherent Scatter Form Factor.

Estimated material coherent scatter form factor ("FORM FACTOR") in X-ray scanning refers to a mathematical function that describes how a material scatters X-rays coherently. This occurs when X-rays interact with the electrons in a material and are scattered in a coordinated way, maintaining their phase relationship. This scattering pattern provides information about the arrangement of atoms or molecules within the material. The form factor characterizes the probability of an X-ray being scattered by the material at a specific angle and/or energy. It depends on the type of material and the X-ray momentum transferred in the scattering process. Here we are trying to minimize the impact of Compton scattering and thus have a FORM FACTOR that is primarily based upon coherent scattering. This FORM FACTOR can be used to determine the material's atomic structure and composition as well as perform material identification and/or classification through a number of processes already known in the art including matching to a library of material form factors or the application of machine learning techniques. Additional methods of converting a FORM FACTOR into an estimated material match will continue to be developed in this field.

Or.

Unless explicit to the contrary, the word "or" should be interpreted as an inclusive or rather than an exclusive or. Thus, the default meaning of or should be the same as the more awkward and/or.

Set.

Unless explicit to the contrary, the word "set" should be interpreted as a group of one or more items.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process, it is useful to note that a given parameter is substantially met. Examples may be substantially parallel, substantially perpendicular, substantially uniform, and substantially flat. In this context, substantially X means that for purposes of this industrial process it is X. Thus, something that may not be absolutely parallel but is for all practical purposes parallel, is substantially parallel. Likewise, mixed air that has substantially uniform temperature would have temperature deviations that were inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway —thus the word "substantially" may prevent avoidance of infringement by minor changes that do not affect the results sought to be accomplished.

Units.

Note that in order to provide focus on specific functions, the description below will reference various "units". In this context, a unit implies the required resources to perform a given set of functions. This may include a combination of electro-mechanical devices such as a microphone or a camera and the processing power to control the devices then manipulate the data obtained by the devices. In some instances, the functionality from several individually discussed units may be performed using physical components that are shared by several of the units discussed below. Unless explicit to the contrary, the word "or" should be interpreted as an inclusive or rather than an exclusive or. Thus, the default meaning of or should be the same as the more awkward and/or.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Some aspects of the teachings of the present disclosure may be expressed as a method of obtaining estimated material coherent scatter form factors characterizing a material found in a cluster of voxels within a scan object, the method comprising:

advancing the scan object in a Y direction through a coherent scatter scanner;

exposing a series of slices of the scan object to an X-ray fan beam that is in a fixed location within the coherent scatter scanner and oriented perpendicular to the Y direction of travel of the scan object;

capturing coherent scatter data at a set of at least two X-ray detector modules wherein: each X-ray detector module in a fixed position relative to the coherent scatter scanner; each X-ray detector module limited to a small-angle field of view by at least one detector side angle limiting element; and at least two of the set of at least two X-ray detector modules are positioned on a first side of the X-ray fan beam, with each of set of at least two-X-ray detector modules on the first side of the X-ray fan beam seeing diffractions from different portions of the X-ray fan beam;

combining the coherent scatter data from the at least two X-ray detector modules to generate an aggregated collection of estimated material coherent scatter form factors for at least some voxels;

combining the aggregated collection of estimated material coherent scatter form factors with a separate model of aggregate items that clusters sets of voxels in the scan object into model items; and using the aggregated collection of estimated material coherent scatter form factors to assign an estimated material type to individual model items.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Prophetic Examples

As requested in MPEP Section 608.01 (p), applicants note that the figures that are in this disclosure are based on computer models of how a X-ray scatter measurement system would operate. No actual data from X-ray information collected at X-ray detector modules is shown in this application. Those of skill in the art will appreciate that in the field of X-ray scatter measurement which leans heavily on computational muscle to limit the need for expensive X-ray detector modules and X-ray sources, that detailed mathematical models of what should be expected are normative in this field.

FIG. 7.

Figure 7:
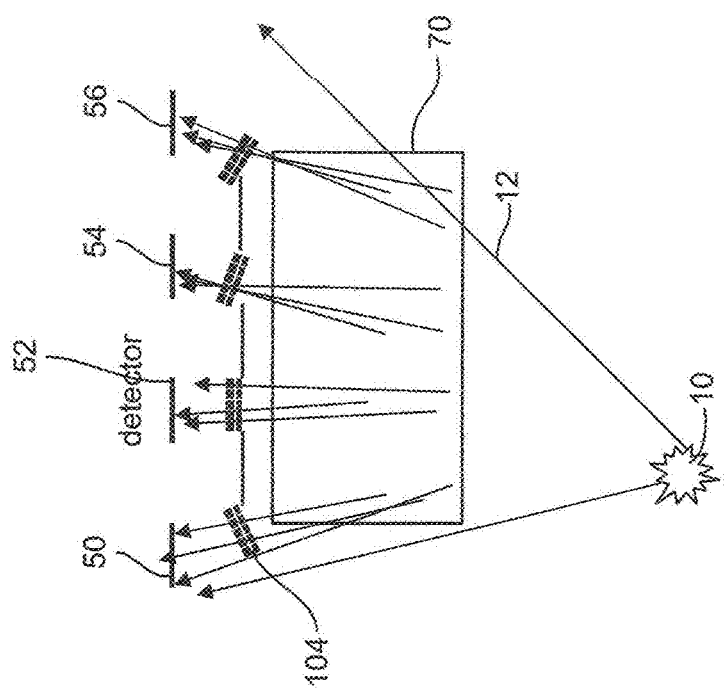
FIG. 7 show an X-ray source 10 emits X-rays which are shaped into an X-Z fan beam 12 which is sized to interrogate a most of a scan object 70 such as a suitcase traveling on a belt in the Y-direction in a tunnel.

FIG. 7 provides a first example that helps overcome the deficiencies identified above. In FIG. 7, an X-ray source 10 emits X-rays which are shaped into an X-Z fan beam 12 which is sized to interrogate most of a scan object 70 such as a suitcase traveling on a belt in the Y-direction in a tunnel. The X-rays hit material at a variety of X, Y, Z voxels in the scan object 70 such as a suitcase and this causes scatter of some of the X-ray. A set of collimators 104 limits the angles of X-rays that reach the set of X-ray detector modules (50, 52, 54, and 56). As discussed below, limiting each of the X-ray detector modules (50, 52, 54, and 56) to a small-angle field of view helps eliminate Compton scatter and other noise so that the coherent scatter becomes the dominant driver of the X-rays received at the X-ray detector modules (50, 52, 54, and 56).

FIG. 8.

Figure 8:
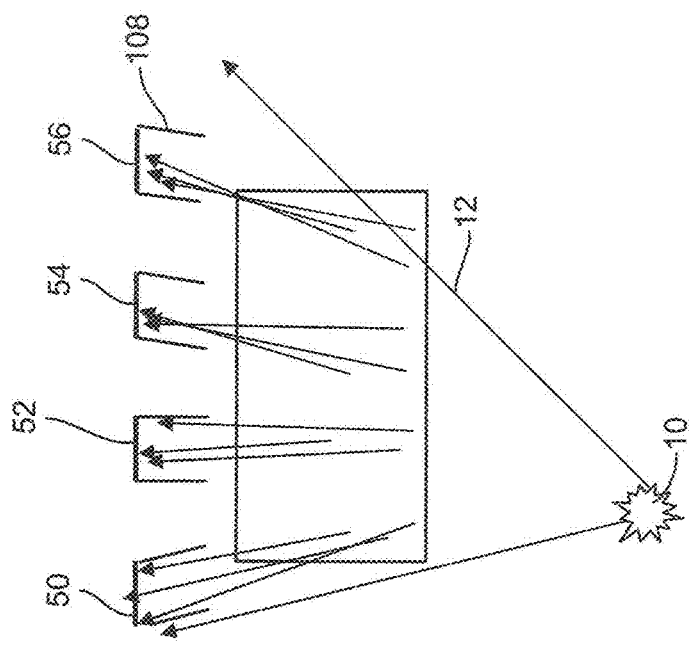
FIG. 8 is much like FIG. 7 but uses a set of X-ray absorbing blinders 108 to limit the angles of X-ray paths that can reach each of the X-ray detector modules (50, 52, 54, and 56).

FIG. 8 is much like FIG. 7 but uses a set of X-ray absorbing blinders 108 to limit the angles of X-ray paths that can reach each of the X-ray detector modules (50, 52, 54, and 56). The blinders may extend from all four edges of the X-ray detector modules (50, 52, 54, and 56). In FIG. 8, there are X-ray paths originating from a variety of starting points in the scanned object 70. As discussed in connection with FIG. 20, the blinders 108 may be open 10 to 15 degrees to allow in a range of small angle diffraction X-rays from a number of different voxels. Those of skill in the art will appreciate that an opening of 10 to 15 degrees is a deviation from the prior art practice of limiting diffraction X-rays access to a detector through a much more limiting "narrow" opening such that it is substantially parallel to the center line of the collimator.

The collimators 104 and the blinders 108 fall into the category of angular limiting elements. Other angular limiting elements not shown here but known to those of skill in the art include be one or more of any combination of blinder/tube, blocking plate, collimator, anti-scatter grid, thick coded aperture (or collimated aperture), reference structure, polycapillary tubes, or other similar element. The use of angular limiting elements defines a multitude of modular fields of view, each specific to an individual detector module such that each detector module is simultaneously sensitive only to a limited angular region within the region of interest.

The blinders 108 may be in the form of elongated chutes that extend from the edges of the X-ray detector modules (50, 52, 54, and 56). Those of skill in the art will appreciate that FIG. 7 is illustrative of concepts and not what one would actually see. As previously discussed, the best practice is to locate the planar X-ray detector module on one side or the other of the fan beam 12 so that direct X-rays that are in the fan beam 12 and not coherently scattered do not strike the X-ray detector modules (50, 52, 54, and 56). Thus, no matter which side of the fan beam 12 that the X-ray detector modules (50, 52, 54, and 56) are located, a rectangular chute for the blinders 108 would result in a solid wall shown in this figure. As a solid wall would hide the movement of X-rays to strike the X-ray detector modules 50, 52, 54, and 56), the solid walls are not shown here. One of the alternatives to blinders 108 or collimators 104 is the use of blocking plates which block X-rays of large angular deviation from reaching the array of X-ray detector modules (50, 52, 54, and 56). The blocking plates would block the much of the noise from Compton scattering as much of the Compton scattering is large-angle scattering.

The combination of a set of X-ray detector modules 50, 52, 54, and 56, which each X-ray detector module limited to receive small-angle scatter allows for capture of small-angle scatter over a wide field of view.

FIG. 9.

Figure 9:
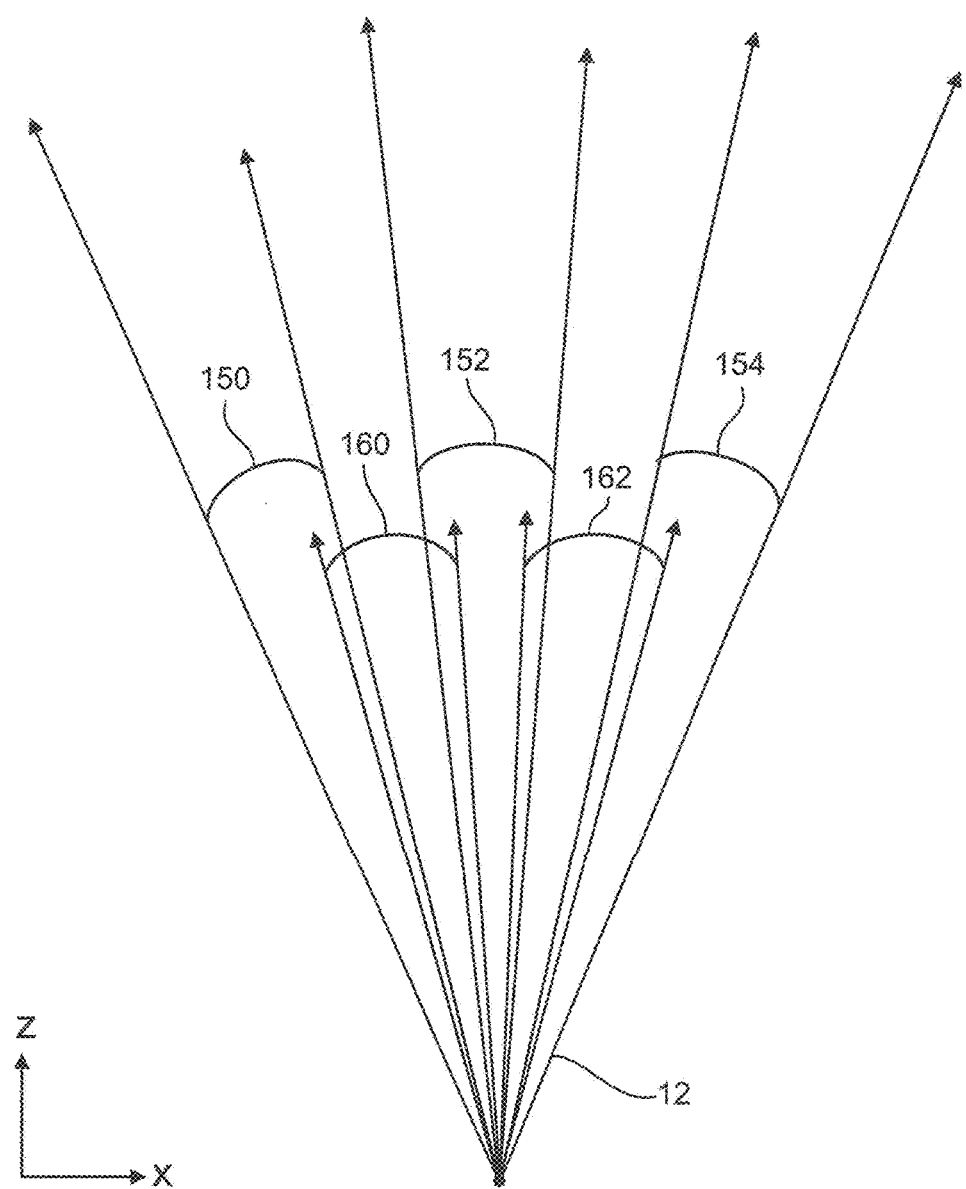
FIG. 9 illustrates a system configured with a series of five X-ray detector modules all placed on the same side of the fan beam 12 with each X-ray detector module positioned and protected by angle limiting elements to see a specific angular portion of the fan beam 12.

FIG. 9 shows a representation of a fan beam 12. For a system configured with a series of five X-ray detector modules that are all placed on the same side of the fan beam 12. Each X-ray detector module (not shown here) will be positioned and protected by angle limiting elements to see a specific angular portion of the fan beam 12. For example, the leftmost X-ray detector module may see coherent scatter caused by a first angular portion 150 of the fan beam 12. A middle X-ray detector may see coherent scatter caused by a second angular portion 152 of the fan beam 12. A rightmost X-ray detector module may see coherent scatter caused by a third angular portion 154 of the fan beam 12. A first intermediate X-ray detector module may see coherent scatter by a first intermediate angular portion 160 that may include a bit of overlap with angular portions 150 and 152. Likewise, a second intermediate X-ray detector module may see coherent scatter by a second intermediate angular portion 162 that may include a bit of overlap with angular portions 152 and 154. Thus, a set of X-ray detector modules will receive coherent scatter from different angular portions of the fan beam so that the received data may be compiled from the multiple X-ray detector modules to provide a wide field of view of the X-Z slice of the scan object while limiting each X-ray detector to the receipt of small-angle scatter. As discussed in connection with FIG. 20, the angular extent of portion 150, 152, 154, 160, and 162 may be 10 to 15 degrees in the plane shown.

One of skill in the art will appreciate that the number of X-ray detector modules may be more or less than the five X-ray detector modules referenced in FIG. 9. The number used may be a function of the size of the scan object and the desired throughput of the scan object through the scanner.

Figure 10:
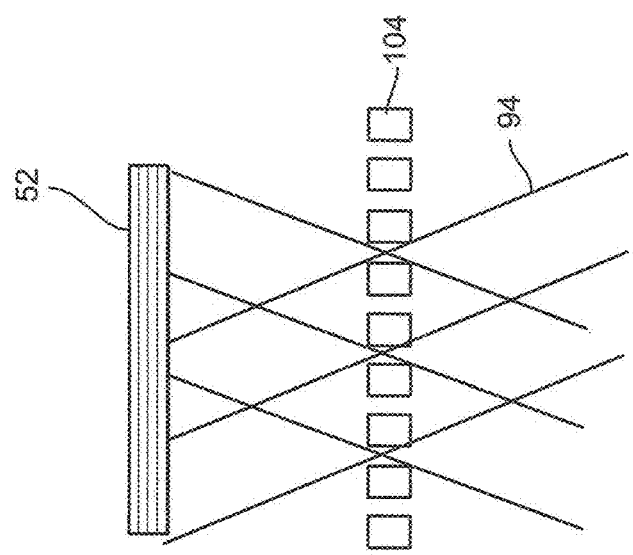
FIG. 10 shows a cross section of two different angular limiting elements-blocking plates 120 and blinders 106.
Figure 11:
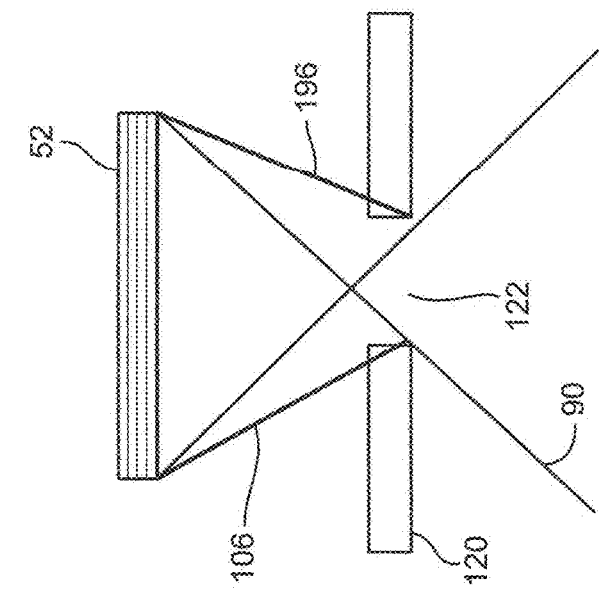
FIG. 11 shows a cross section of another type of angular limiting element-a thick sinusoidal exit limiting element.

FIG. 10 and FIG. 11.

FIG. 10 shows a cross section of two angular limiting elements. Blocking plates 120 have an opening 122 that limits the range of scatter X-rays 90 that can reach the X-ray detector module 52. The blocking plates 120 may be replaced by blinders 106 that have the same opening 122 and same limit on the range of scatter X-rays 90. Notice that blinders 108 have blinder walls 196 that taper inward from the X-ray detector module 52 to the opening 122

FIG. 11 shows a cross section of another type of angular limiting element. A series of collimators 104 may be positioned to form a thick sinusoidal exit limiting element. The collective throughput of the series of collimators 104 may be used to provide aggregate access of a set of scatter X-rays 94. The use of angular limiting elements such as blocking plates 120, blinders 106 or 108, a series of collimators 104 forming a thick sinusoidal exit limiting element, or other angular limiting elements may be used to reduce the noise from Compton scattering.

FIG. 12 to FIG. 17.

FIG. 12 to FIG. 17 shows sets of computer-generated data to illustrate the impact of angle limiting elements on the detector side of a device. As these are computer-generated sets of data, the Compton large-angle scatter and the coherent scatter can be modeled and displayed separately. An actual detector module 50 would be exposed to both forms of scatter at the same time. These sets of figures are useful in illustrating that the Compton large-angle scatter that reaches the detector module 50 can be significantly reduced without meaningful reduction in the coherent scatter.

Figure 12:
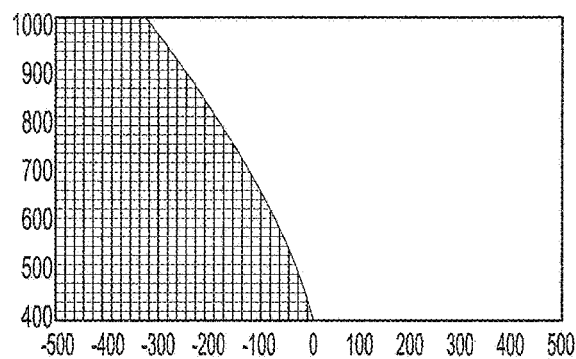
FIG. 12 to FIG. 17 shows sets of computer-generated data to illustrate the impact of angle limiting elements on the detector side of a device in limiting receipt of Compton scatter while not significantly impinging on the receipt of coherent scatter.
Figure 15:
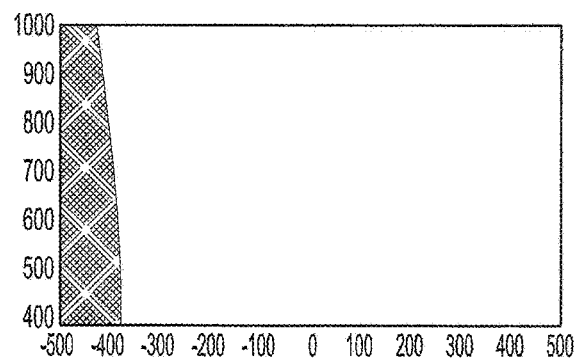

FIG. 12 shows the Compton large-angle scatter that would reach a X-ray detector module 50 without detector side filtering. A color version of FIG. 12 would show an intense amount of Compton large-angle scatter on the left side of the graph that gradually decreases to trace amounts. The limitations of black and white drawings do that capture that nuance but merely shows observed Compton large-angle scatter or no discernable Compton large-angel scatter. Anyone with an interest may view the original color drawings for what is now FIG. 12-FIG. 17 by downloading the file with the figures from the United States Provisional Application as those files are made available to the public by the United States Patent Office after this application publishes. FIG. 15 shows the data from a model of the coherent scattering that reaches the X-ray detector module 50. FIG. 15 provides a base line of what coherent scattering exists so that the impact of various angle limiting elements to limit Compton large-angle scatter can be checked for adverse impact on the receipt of coherent scatter.

Figure 13:
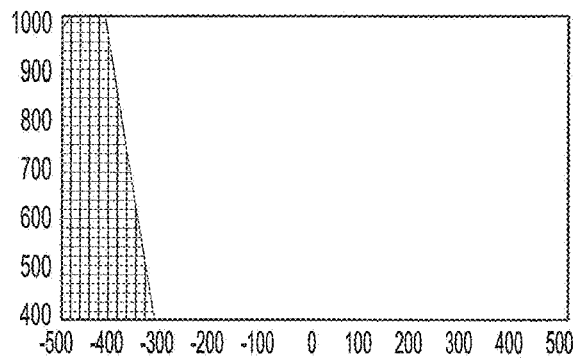
Figure 16:
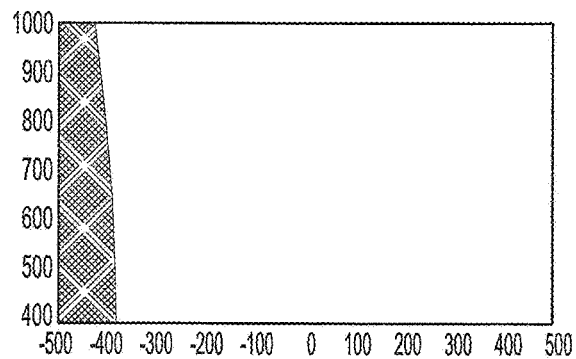

FIG. 13 shows the same computer model but now the model includes a thick sinusoidal exit limiting element. The sinusoidal element serves to filter out much of the Compton scatter from reaching the X-ray detector module but as shown in FIG. 16, the receipt of coherent scatter is nearly unchanged.

Figure 14:
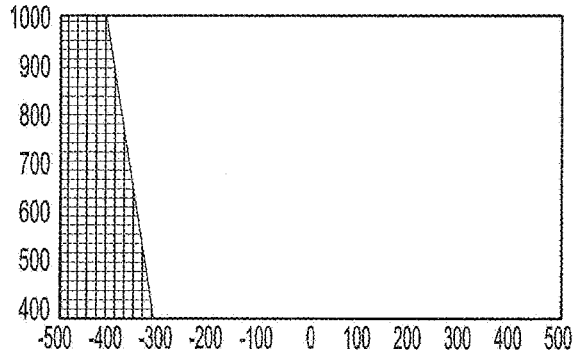
Figure 17:
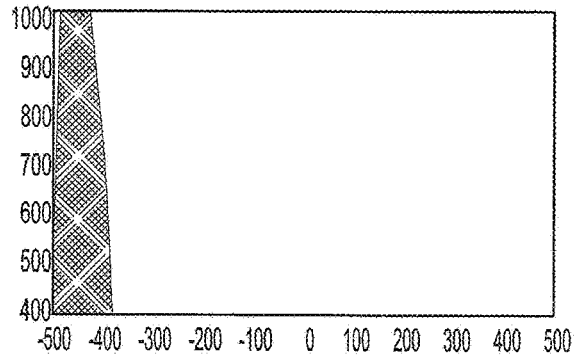

FIG. 14 shows a reduction, but not total elimination of the Compton scatter that reaches the X-ray detector module 50 through the use of blocking plates 120 with openings 122 sized to match the size of the two-dimensional X-ray detector modules (50, 52, 54, and 56). The same results could have been generated by the use of blinders 108 such as those referenced in connection with FIG. 8 as a designer can use either blinder boxes 108 or blocking plates 120 to dial in a particular angle limitation for scatter reaching the detector module. As shown in FIG. 17, the use the use of blocking plates 120 or blinders 108 leaves the receipt of coherent scatter nearly unchanged while severely limiting Compton scatter.

FIG. 18.

Figure 18:
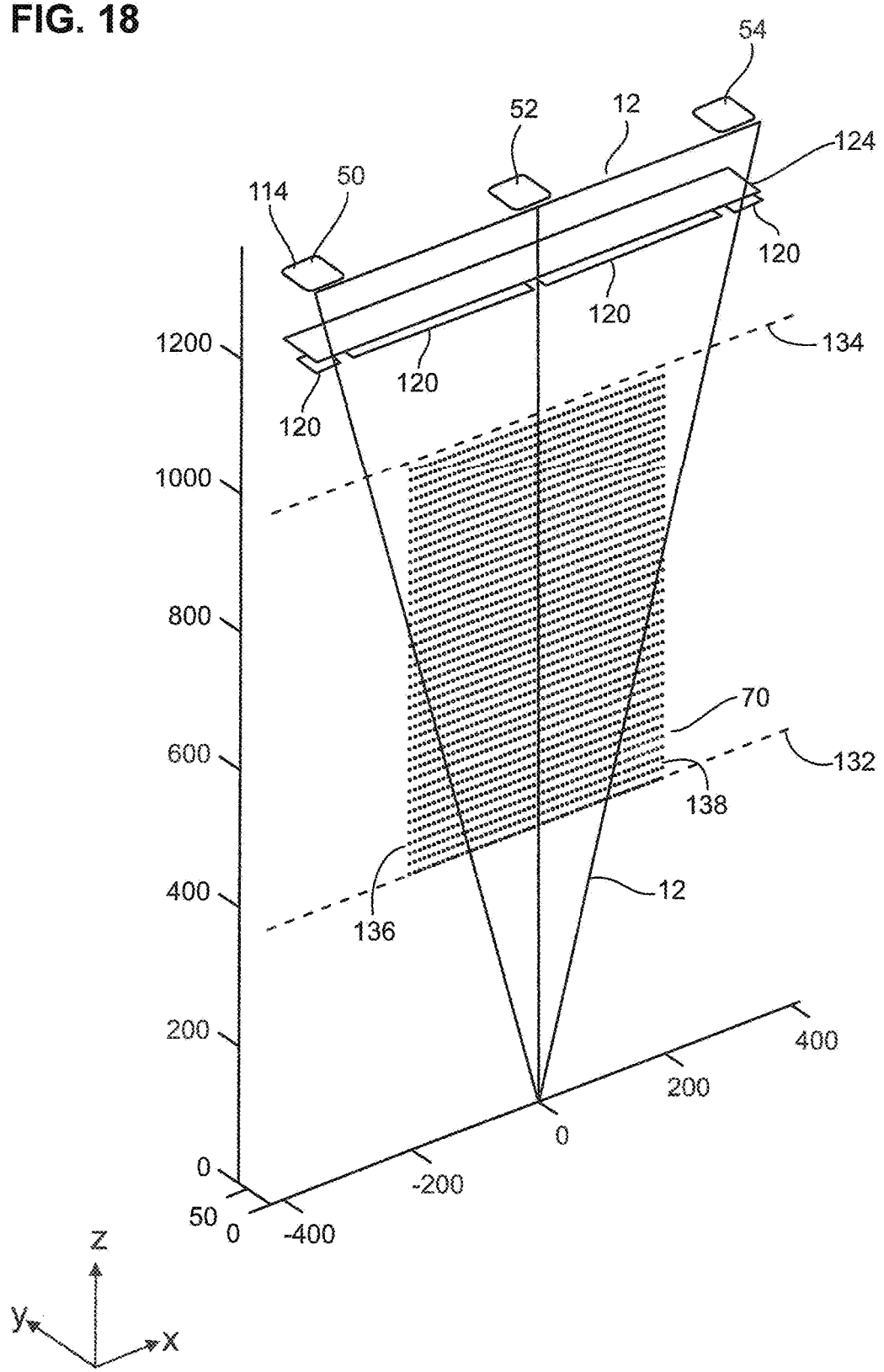
FIG. 18 shows a system with a X-Z fan beam 12 that is striking a portion of a scan object 70 shown as a matrix of voxels. The system includes blocking plates 120 to filter out large-angle Compton scatter.

FIG. 18 shows a system with a X-Z fan beam 12 that is striking a portion of a scan object 70 shown here as a matrix of voxels. The three X-ray detector modules 50, 52, and 54 are not in the same plane as the X-Z fan beam 12. A series of blocking plates 120 adapted to absorb almost all of the X-rays provide a series of openings. The X-rays that pass beyond the blocking plates 120 are filtered by X-ray absorbing coded aperture 124. The use of blocking plates 120 and a series of X-ray detector modules 50, 52, and 54 make this a system that is tuned for coherent scattering and filters out Compton scattering.

A series of simulations were run with a 60 keV source illumination emitted as a 70-degree fan beam 12. The simulation was performed assuming that the tunnel cross section had consistent momentum transfer properties with q=0.05 up to q=0.45. As the X-ray scatter angles of interest were 1 to 10 degrees, the X-ray detector modules that were 4 cm by 4 cm were shielded from X-rays coming at wider angles. Elongated rectangular blinders 108 (FIG. 8) with interior dimensions of 4 cm by 20 cm shielded the X-ray detector modules from detector scatter in excess of eleven degrees. For example, a set of seven different detector modules each with a 10-degree field of vision could cover the entire scan object 70.

FIG. 19.

Figure 19:
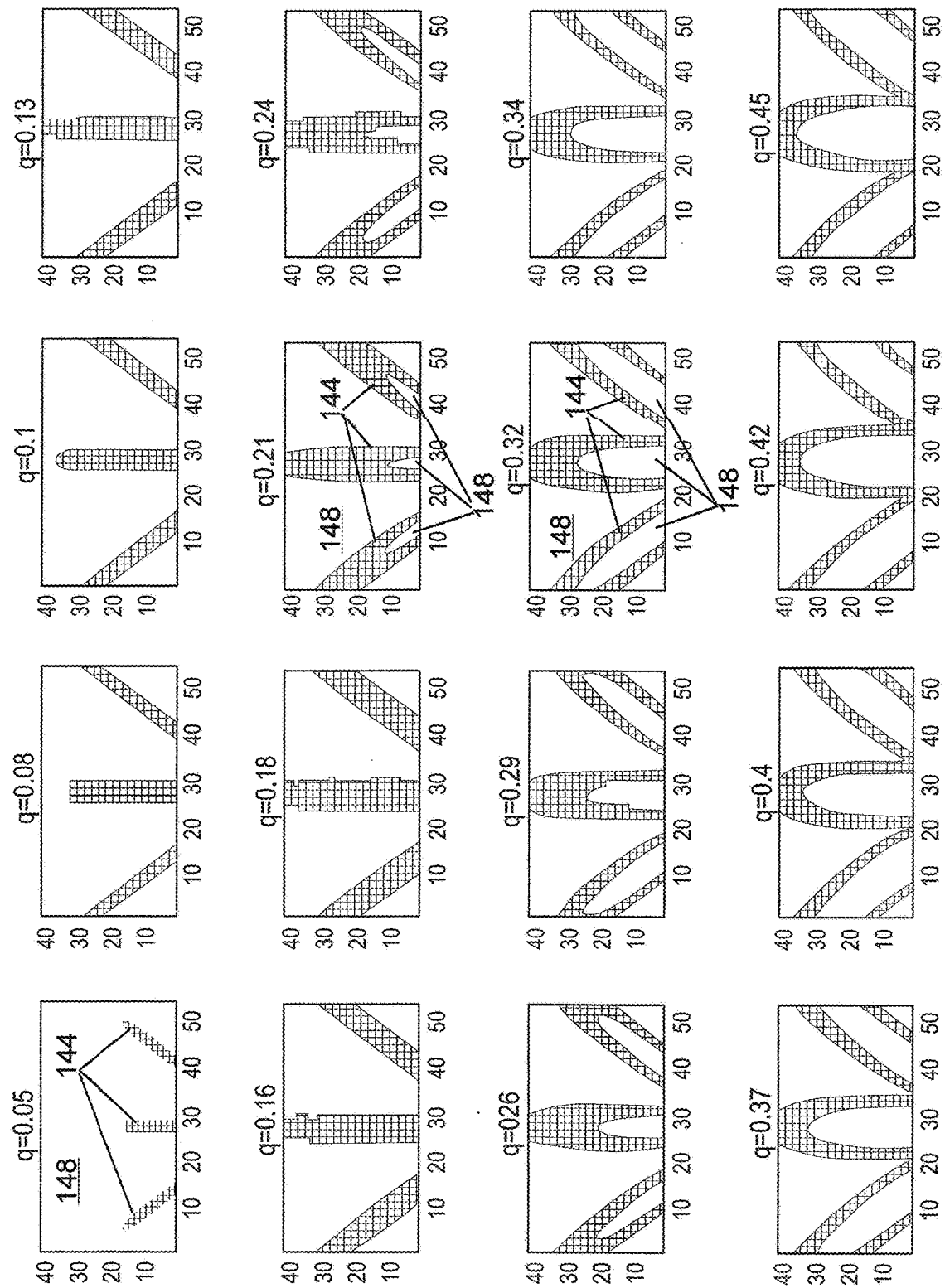
FIG. 19 shows computer models of the visibility in the tunnel versus q values for the system shown in FIG. 18 with three detector modules 50, 52, and 54 above a set of blocking plates 120 and a coded aperture 124.

FIG. 19 shows computer models of the visibility in the tunnel versus q values for the system shown in FIG. 18 with three detector modules 50, 52, and 54 above a set of blocking plates 120 and a coded aperture 124. The graphs of the model use the units of the number of voxels which would be dependent on the defined size of a voxel used in the model. Looking back to FIG. 18 one can see the dimensions of the scan object 70 from edge 136 to edge 138 is 40 cm. The height of the scan object 70 from bottom edge 132 to top edge 134 is 60 cm.

Each of the computer-generated models of visibility for a particular q value shows the ability for the series of X-ray detector modules 50, 52, and 54 to receive X-rays that coherently scatter from different X-Z voxels (Y is constant). As noted above, this result is a function of the distances between source that forms the fan beam 12 and both the scanned area of the tunnel and the Z dimension for the series of X-ray detector modules 50, 52, and 54. The Y distance between the edges of the series of X-ray detector modules 50, 52, and 54 and the plane containing the X-ray fan beam 12 have an impact too. A change in the energy level of the X-rays uses will narrow or broaden the cones of coherently scattered X-rays and will thus change the visibility.

Figure 5:
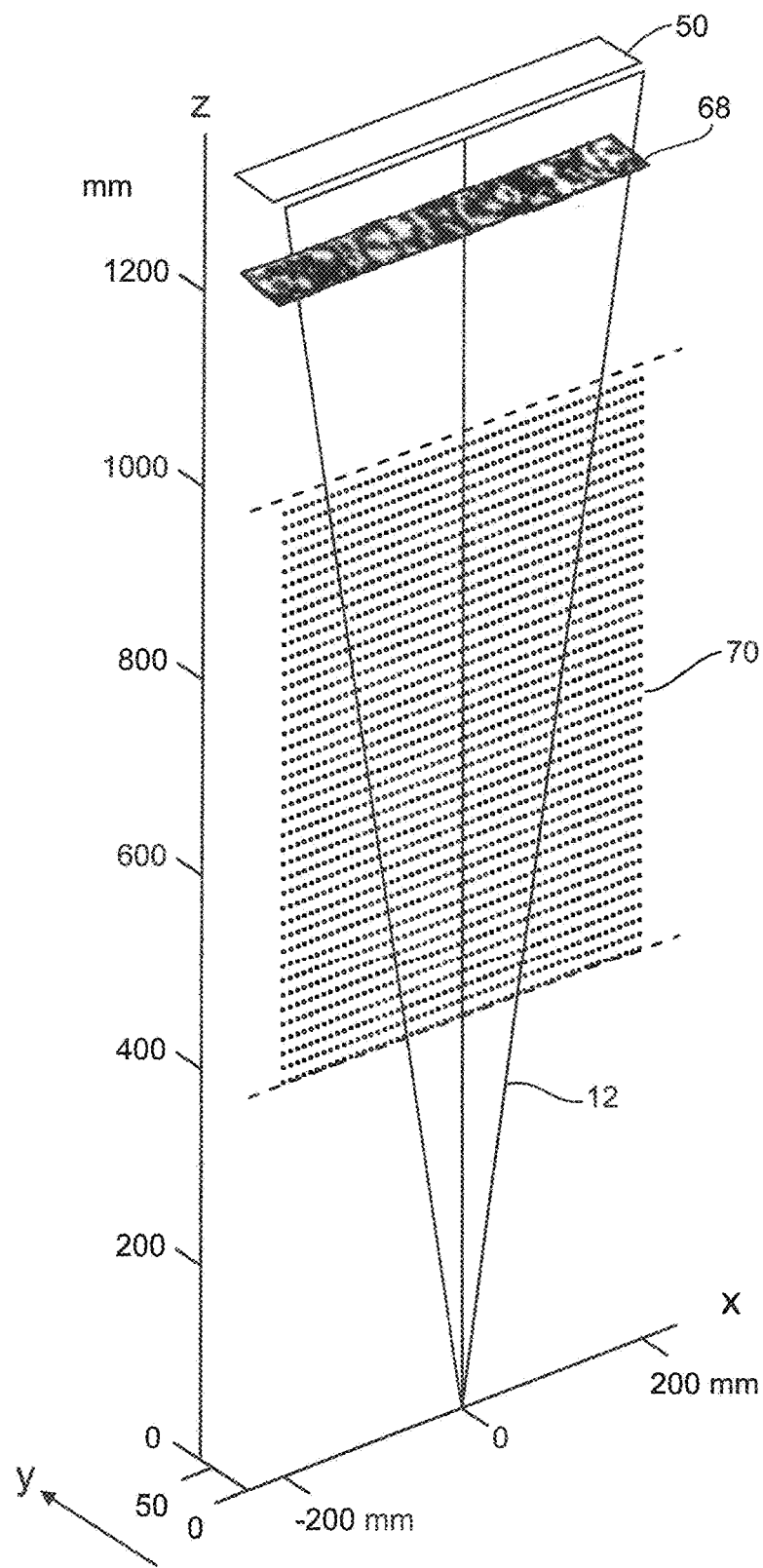
FIG. 5 shows a fan beam 12 passing through a portion of a X-Z slice of a scan object 70 such as a suitcase moving in the Y direction on a belt in a tunnel as known in the prior art and an X-ray detector module 50.
Figure 6:
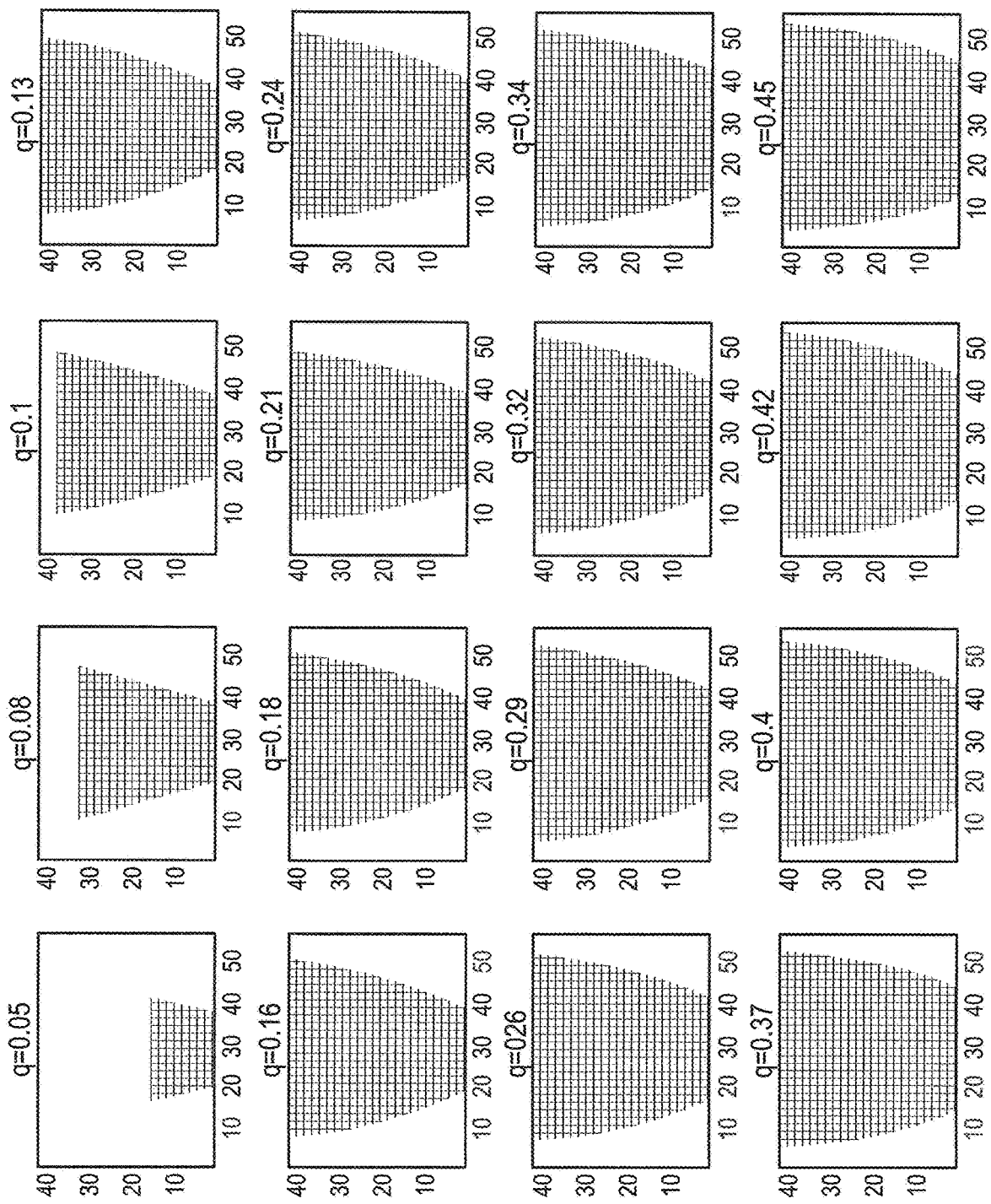
FIG. 6 shows a series of computer model graphs for scans of a scan object 70 such as a suitcase as known in the prior art. These graphs show visibility in the tunnel as a function of q.

A person of skill in the art looking at the series of model results as a function of q at a given X-ray energy might find that the movement of test apparatus from that shown in FIG. 5 with an elongated single X-ray detector module 50 to a series of X-ray detector modules 50, 52, and 54 shielded by a set of blocking plates 120 would be heretical as it greatly increased the amount of white area indicating blind spot zones on the graphs of model results. This means that the movement to the test apparatus of FIG. 18 from the apparatus shown in FIG. 5 greatly increased the number of X-Z voxels (Y is constant) that do not send coherently scattered X-rays for detection. In other words, this change in system components has greatly increased the amount of voxels that are blind spot zones 148.

However, it is not the percentage of voxels that are in blind spot zones 148 but the contiguous zones of voxels in blind spot zones 148 that matter. For example, the voxels in a particular blind spot 148 that are substantially surrounded by scanned voxels that form a leaf blade 144 are not a risk of deleterious effects of blind spot zones 148 as an object that is at least partially touched by a scanned portion of the leaf blade 144 may be associated with a FORM FACTOR as described below. In order to avoid unnecessary clutter of the set of graphs, only a few graphs have been annotated with elements 144 and 148.

Adding additional X-ray detector modules alters the expected response as there will be an additional leaf blade 144 for each detector module and this will decrease the locations within the tunnel that have significant areas of contiguous blind spot zones as this will increase the number of leaf blades 144. Thus, instead of three X-ray detector modules 50, 52, 54, and 56 as shown in FIG. 18, there may be five, six, seven, or even more X-ray detector modules which would add additional leaf blades of visible area. Many small areas of contiguous blind spot zones are tolerable as long as there are not large areas of contiguous blind spot zones 148.

One of skill in the art will appreciate that the set of three X-ray detector modules 50, 52, and 54, would be considerably less expensive than the single elongated X-ray detector module 50 shown in FIG. 5 at the cost of the X-ray detector module portion of the system is primarily dependent on the surface area of the X-ray detector modules and the arrangement in FIG. 18 has much less surface area than the elongated X-ray detector module in FIG. 5. One of skill in the art could extend the edges 114 of the X-ray detector modules 50, 52, and 54, in the Y direction (away from the fan beam 12). This would allow the enlarged detector modules to pick up additional X-rays from scatter cones for certain q values that are extended too far in the Y direction to hit the original size X-ray detector modules 50, 52, 54, and 56.

FIG. 20.

Figure 20:
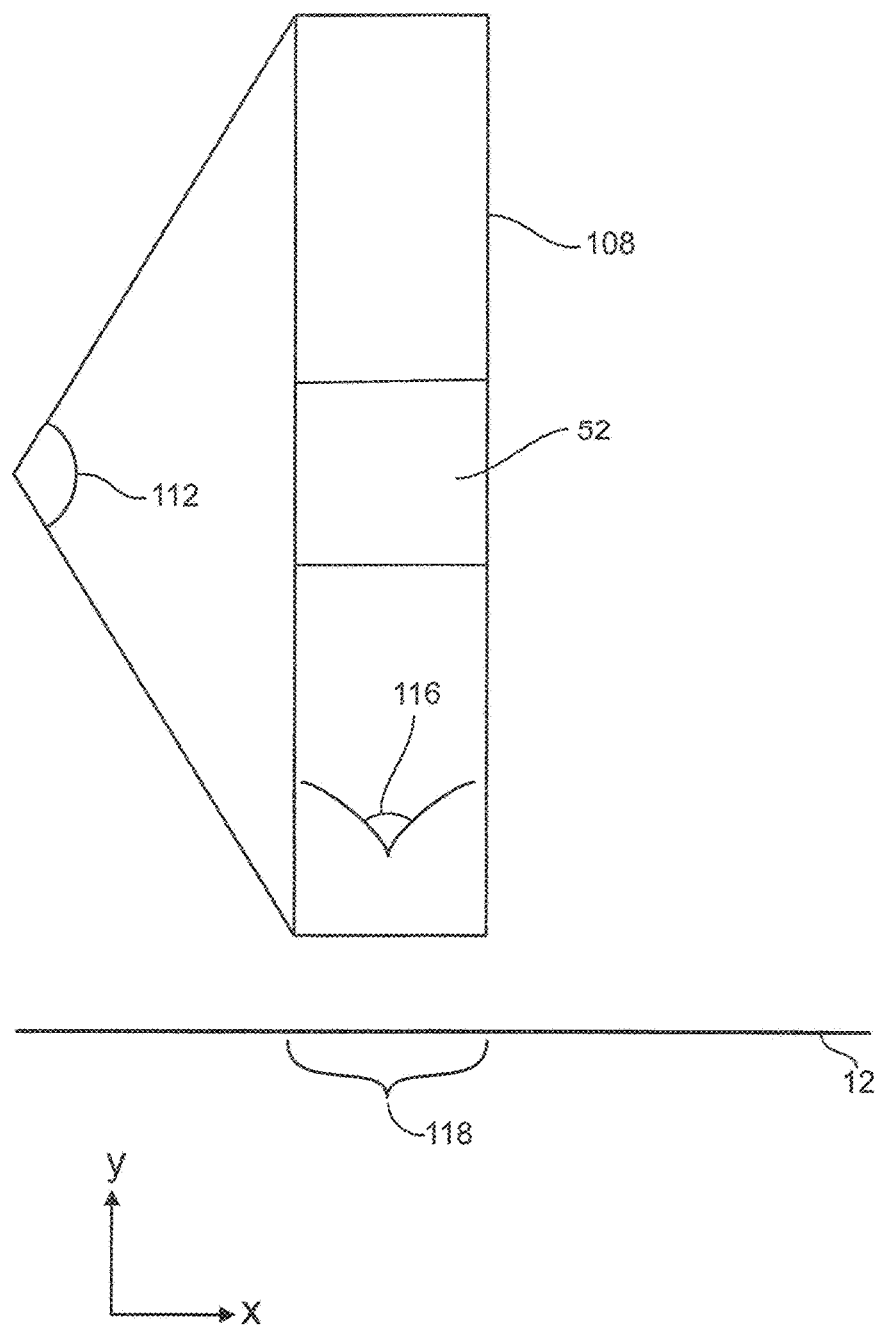
FIG. 20 shows a top view of an elongated rectangular blinder 108 limiting the field of view for a X-ray detector module 52 from X-ray scatter caused by fan beam 12.

FIG. 20 shows a top view of an elongated rectangular blinder 108 limiting the field of view for a X-ray detector module 52 from X-ray scatter caused by fan beam 12. One of skill in the art will understand that the asymmetric dimensions of the of the elongated rectangular blinders 108 versus the square X-ray detector modules 52 reveal a use of asymmetric small-angle fields of view. There is a first small-angle field of view 112, that is perpendicular a plane containing the X-ray fan beam 12. This first small-angle field of view may be in the range of 25 degrees. Those of skill in the art will appreciate that an angular acceptance of 25 degrees is a deviation from the prior art practice of limiting diffraction X-rays access to a detector through a much more limiting "narrow" opening such that the beam is substantially parallel to the center line of the collimator. There is a second small-angle field of view 116 that is parallel to the plane containing the fan beam 12. This second small-angle field of view 116 may be in the range of only 10 to 15 degrees so that an individual X-ray detector in the X-ray detector module is not being hit concurrently with many different X-ray scatter events from a string of voxels being hit by the width of the fan beam 12 at the same time. There is less of a problem with multiple concurrent scatter events when you are considering the width of the fan beam in the Y direction (perpendicular to the wide direction of the fan beam 12). Thus, the elongated rectangular blinder 108 is adapted to limit the view of an X-ray detector module 52 to an angular segment 118 of the X-ray fan beam 12.

While FIG. 20 shows a square X-ray detector module 52, in keeping with the differences in the need for small-angle fields of view as discussed above, a designer may choose a rectangular X-ray detector module and align the long axis of the rectangular X-ray detector module perpendicular to the plane containing the X-ray fan beam 12.

FIG. 21.

Figure 21:
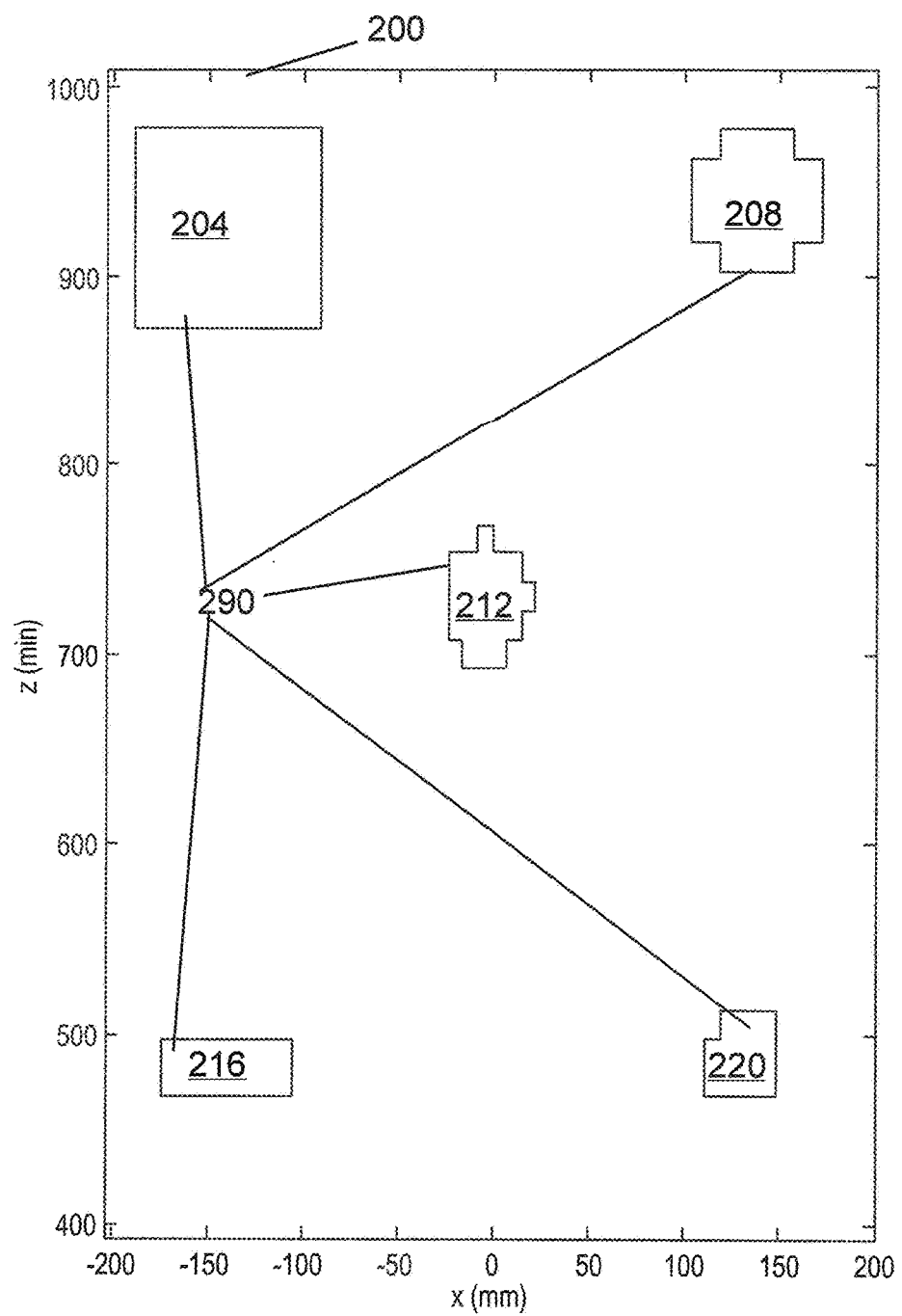
FIG. 21 shows a data model of a slice of a suitcase 200 containing five objects of interest.

FIG. 21 shows a data model of a suitcase 200. The data model has five objects 290 of interest. A real suitcase may have many more than five objects of interest but undue clutter in a drawing detracts from the ability of the drawing to convey ideas.

In an actual use of the X-ray scatter measurement system to characterize objects of interest, the suitcase would pass through a CT scanner. Contiguous voxels in the 3D model created by the CT scanner data that have substantially the same density would be assumed to be part of one contiguous object.

While a CT scanner will not know the precise materials in the five objects of interest, for sake of testing the X-ray scatter system the test model has:

Item 204 which is HMX also called octogen which is a high explosive.

Item 208 which is ANNM which is ammonium nitrate with nitromethane which was the explosive used in the 1995 Oklahoma bombing.

Item 212 which is Urea Nitrate another explosive material that is used by terrorists such as the 1993 World Trade Center bombing.

Item 216 is MHN powder. MHN is an abbreviation for mannitol hexanitrate which is another powerful explosive.

Item 220 is the interior of a container holding a 20/80 mix of methanol and water. Item 220 is not an item containing a threat but a scanning system will need to identify objects that are threats and other objects that are not threats as a goal is to have minimal false alarms where a benign object triggers a search by a security agent FIG. 21 shows a X-Z slice of the bag that extends in the Y direction. Some of these items may be much longer in the Y direction and other slices may show a particular item such as item 212 is larger in that slice than in the slice shown in FIG. 21.

Figure 22:
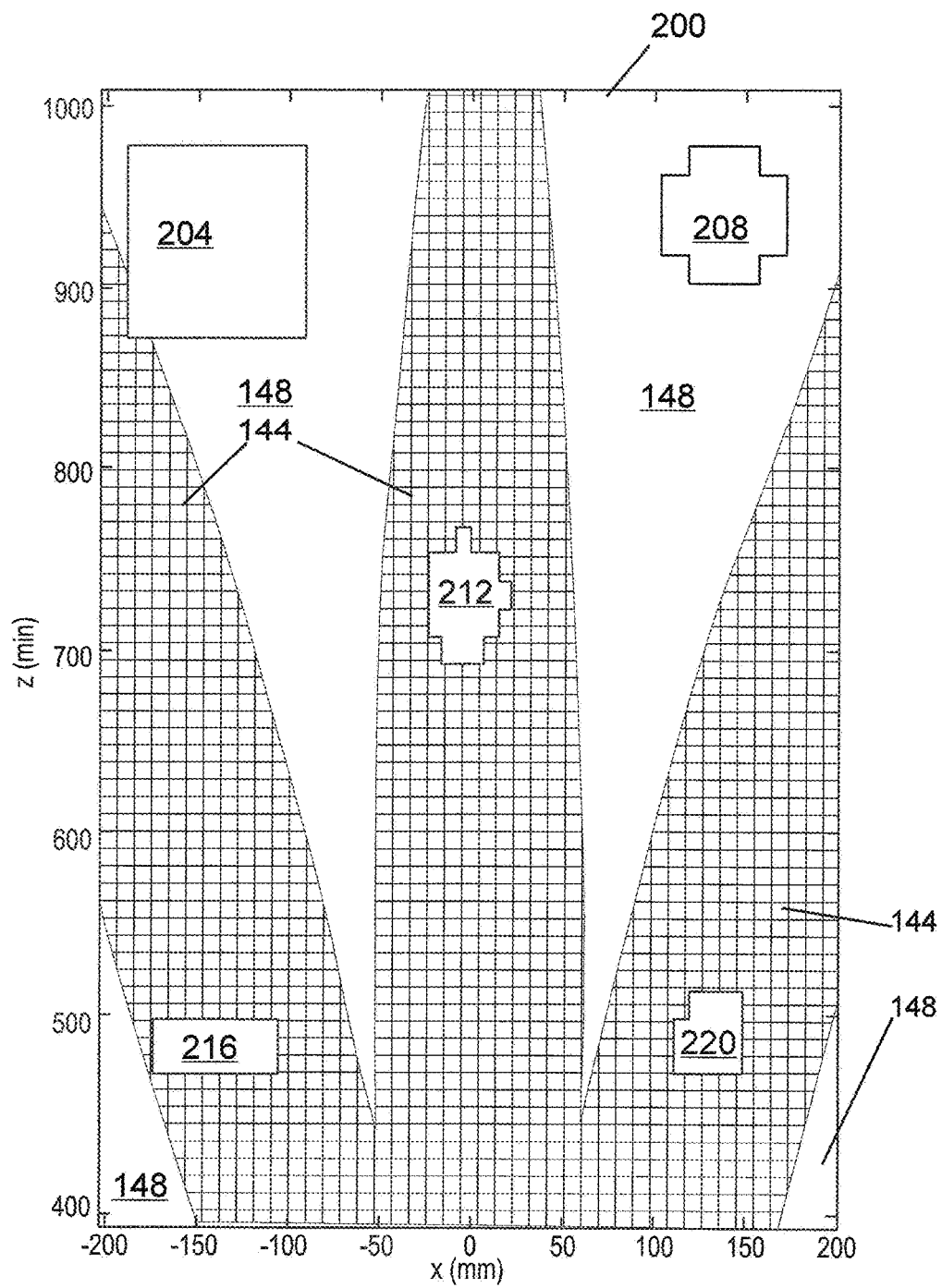
FIG. 22 shows the model of X-ray scatter visibility for a particular value of q in a coherent scatter measuring device using the teachings of the present disclosure for the slice of the suitcase 200 containing five objects of interest.

FIG. 22 shows the model of X-ray scatter visibility for a particular value of q in a coherent scatter measuring device using the teachings of the present disclosure. Those of skill in the art will appreciate that there would be a family of such scatter visibility graphs for different values of q just as shown in FIG. 19. In FIG. 22, there are three X-ray leaf blades 144 show the voxels that are visible to the coherent scatter measuring system at this q value. There are blind spot zones 148 between the leaf blades 144 and outside of the set of leaf blades 144. Items 212, 216 and 220 fall entirely within areas of visibility and thus X-ray scatter that occurs at those items that falls in this specific q value will be visible and available to help collect FORM FACTORS for the material.

Item 208 is totally outside of the set of leaf blades 144 and thus would not be visible to the X-ray detector modules for scattering at this q value.

More interesting is that while item 204 is mostly in the blind spot zone 148, a small portion of item 208 is in a leaf blade 144 and will thus be at least partially visible to an X-ray detector module. One of skill in the art will appreciate that if a material has a FORM FACTOR that has peaks at three different q values that the coherent scatter scanning system would need to have the voxel made of that material to be not in a blind spot for any of the three q values. Unfortunately, the estimated FORM FACTOR results for the tiny portion of item 204 that was not in a blind spot zone 148 were not a good match. More specifically, the FORM FACTOR for item 204 did not match the form factor for HMX which was used to create the model for item 204. In this instance the placement of item 204 near the top of the suitcase 200 led to an estimated FORM FACTOR that was not even close to the ground truth form factor for HMX. It is likely that for other values of q, that item 204 was in a blind spot so that the detectors received only partial information.

Figure 23:
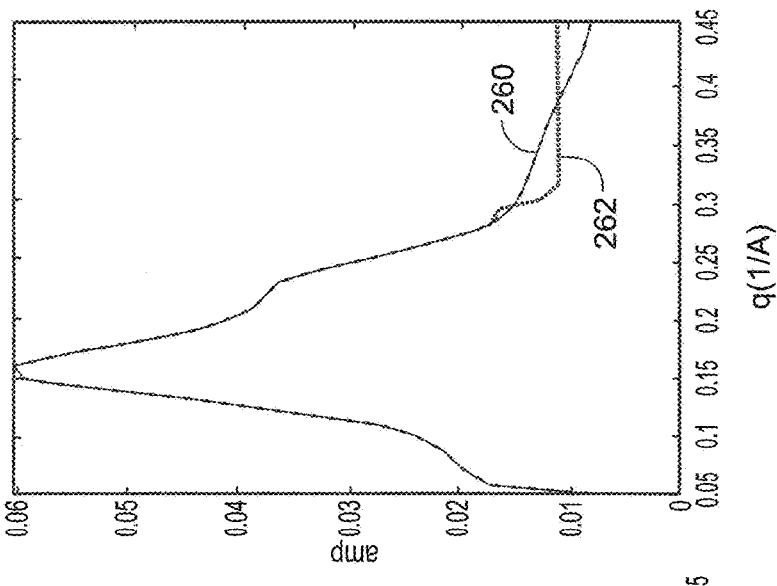
FIG. 23 shows model results for the calculated FORM FACTOR for a voxel of item 212. The model results provide a FORM FACTOR consistent with urea nitrate.
Figure 24:
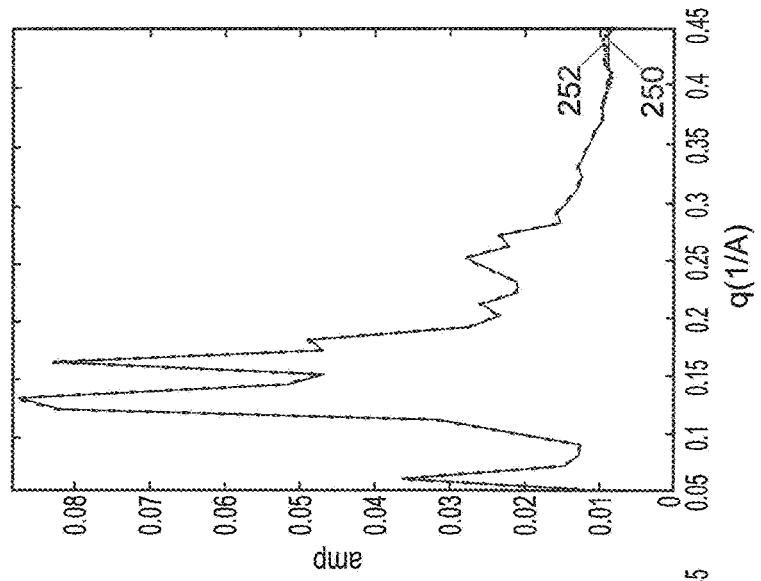
FIG. 24 shows model results for the calculated FORM FACTOR for a voxel of MHN powder which was the material in model item 216 in FIG. 22.
Figure 25:
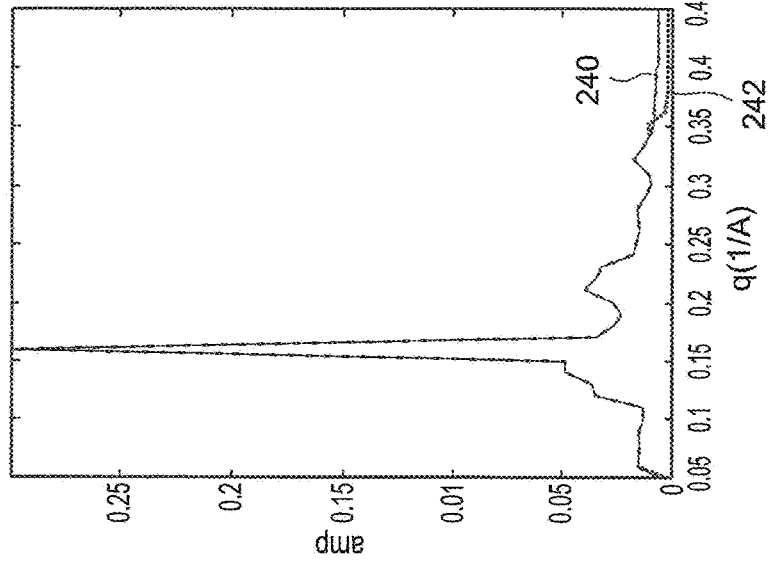
FIG. 25 shows model results for the calculated FORM FACTOR for a voxel of the 20/80 mix of methanol and water that was in model item 220.

FIG. 23, FIG. 24, and FIG. 25.

FIG. 23 shows model results for the calculated FORM FACTOR for a voxel of item 212. This FORM FACTOR is consistent with urea nitrate which was the material used for item 212 when constructing the model of the suitcase 200.

As shown in FIG. 22, for this q value, all the voxels in item 212 were in a leaf blade 144 that was sending coherent scatter that was received by an X-ray detector module 50, 52, or 54. Item 212 was in the upper half of the suitcase 200. There are actually two chart lines here. Ground Truth—the form factor for a material that was used by the model to generate the data and the estimated FORM FACTOR based upon the processing of the data that was received by the X-ray detector modules 50, 52, or 54 in the model.

In FIG. 23, there is a match between the ground truth line 240 and the estimated FORM FACTOR 242. There is a small deviation at the higher q values as some of the X-rays at this level of the suitcase 200 did not deviate laterally sufficiently to strike X-ray detector modules 50, 52, or 54.

FIG. 24 shows model results for the calculated FORM FACTOR for a voxel of item 216. This FORM FACTOR indicates that item 216 contains MHN powder which was the material in model item 216 in FIG. 22. As shown in FIG. 22, for this q value, all the voxels in item 216 were in a leaf blade 144 that was sending coherent scatter that was received by an X-ray detector module 50, 52, or 54. Reviewing FIG. 22, one can note that item 216 was low in the suitcase 200. Not surprisingly, there is very little deviation of the ground truth curve 250 and the estimated form factor 252 even at high values of q.

FIG. 25 shows model results for the calculated FORM FACTOR for a voxel of model item 220. This FORM FACTOR is a very close match to the FORM FACTOR for a 20/80 mix of methanol and water which was the material used in model for model item 220. The lines for ground truth 260 and estimated form factor 262 are a perfect match until a break at the higher q values.

Those of skill in the art will appreciate that the data collected at the X-ray detector modules 50, 52, or 54 must be processed in order to convert that data into an estimate of the FORM FACTOR. The prior art has developed various processes for doing this conversion and more may be developed in the future. Thus, the teachings of the present disclosure are not limited to a specific process to convert the data collected at the set of two or more X-ray detector modules. In general, one would proceed by combining the scatter data from the one or more X-ray detector modules with the information from the separate model of aggregate items that clusters sets of voxels in the scan object into model items. The information from the separate model of aggregate items that clusters sets of voxels in the scan object into model items is sometimes given the short name of "side information". This "side information" plays a critical role in enabling successful operation of the described imaging system, in particular to help constrain the estimation task when the field of view of each detector is widened out to a broad angular field of view, as described in FIG. 8 and FIG. 20. The combined data and side information can be demultiplexed to allow for an estimate of the FORM FACTOR at each voxel using a computational inversion algorithm.

After making an estimate of FORM FACTOR (defined above) for the voxels not in blind spot zones and the conclusion that all voxels of a model object share the same FORM FACTOR, there is likely to be a subsequent step of using the FORM FACTOR to estimate the likely material found at that voxel. One of skill in the art will appreciate that while a few specialists may be able to draw conclusions from the FORM FACTOR directly just as some specialists can read computer machine code in binary, that normally the FORM FACTOR will be processed. There are a number of methods already in use to convert a FORM FACTOR for a voxel into a characterization guess of the material found at that voxel.

Sometimes the FORM FACTOR is compared to a set of stored FORM FACTORS. For example, the FORM FACTOR for particular material could be obtained by testing those material in the coherent scatter scanner. The FORM FACTOR for many materials of interest such as explosives and illicit drugs are available from databases with this information. The FORM FACTOR for many benign materials frequently found in suitcases are also available from databases. Thus, the FORM FACTOR of peanut butter or powdered baby formula may be used to quickly link a model object with a benign material. A material exhibiting a FORM FACTOR that does not match any illicit or benign materials may be flagged for inspection by the operator.

FIG. 26.

Figure 26:
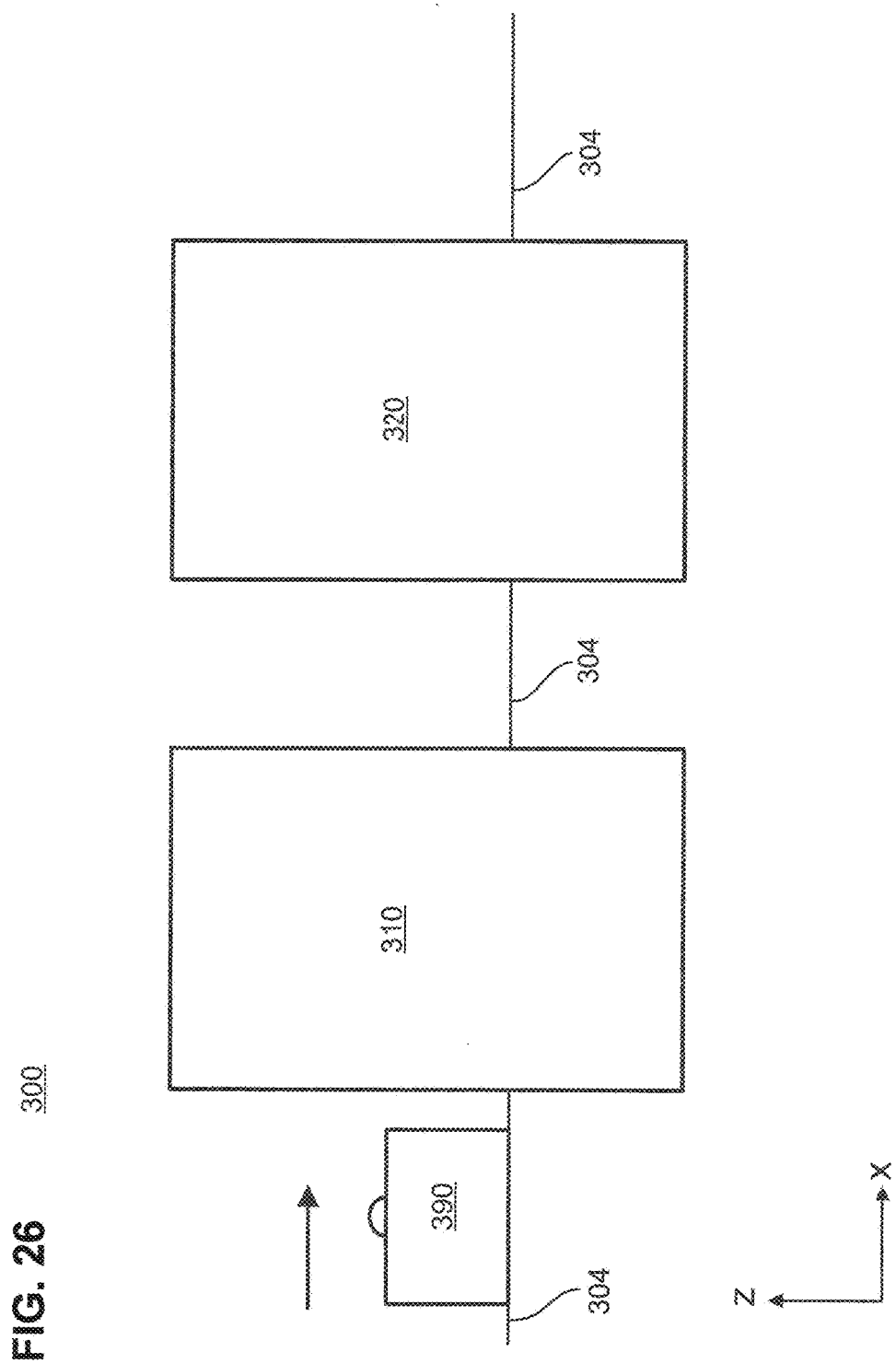
FIG. 26 provides a schematic representation of a system 300 built in accordance with the teachings of this disclosure.

FIG. 26 provides a schematic representation of a system 300 built in accordance with the teachings of this disclosure. A conveyor belt 304 moves through a tunnel in a CT scanner 310 so that individual voxels of a suitcase 390 can be scanned for the density of each voxel. A computer model of the items inside of the suitcase 390 is created by assuming contiguous voxels with substantially the same estimated density are part of the same object.

Figure 1:
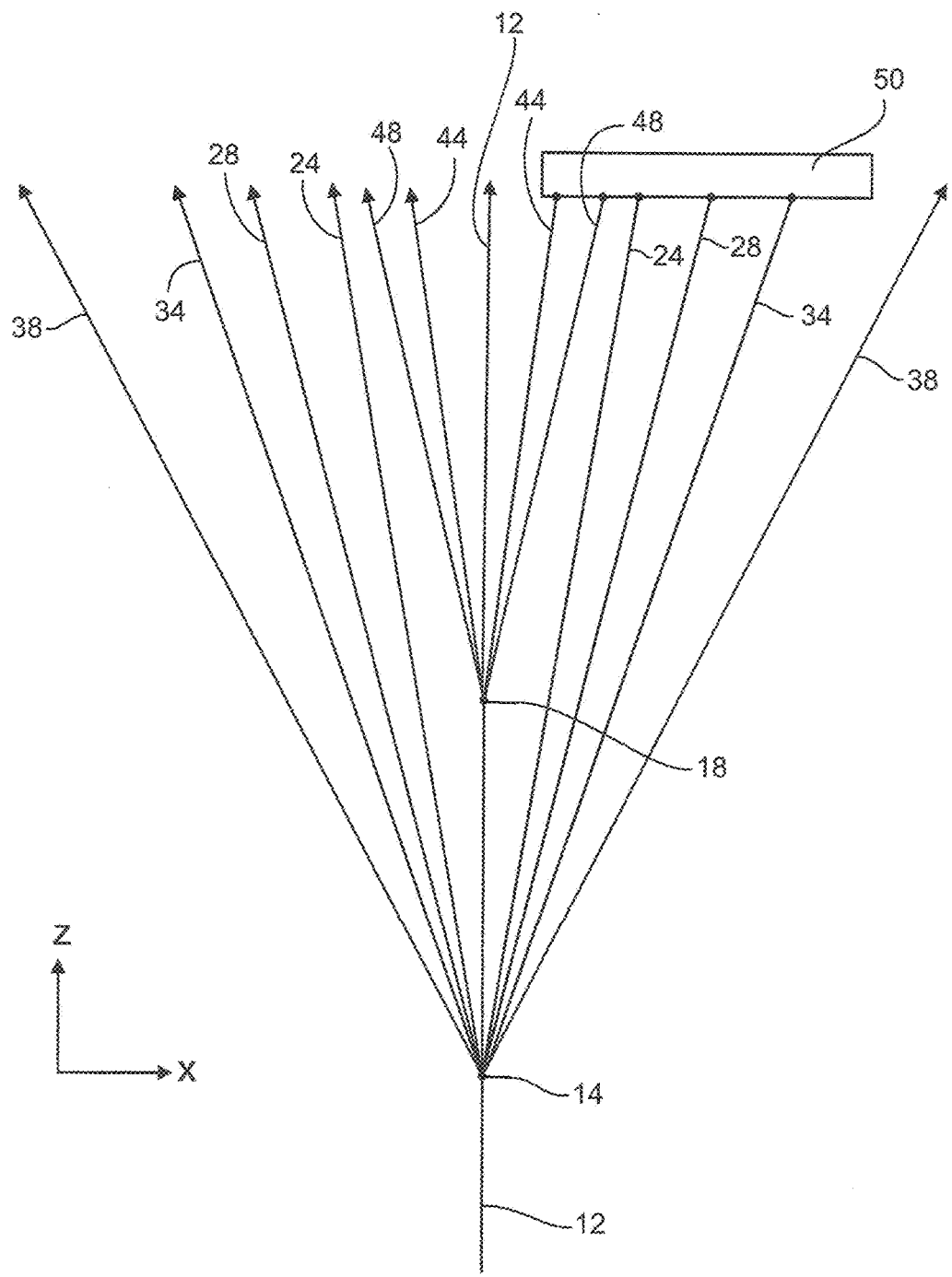
FIG. 1 is a representation of an X-ray fan beam 12 in a X-Z plane as known in the prior art and illustrating X-ray scatter concepts.
Figure 2:
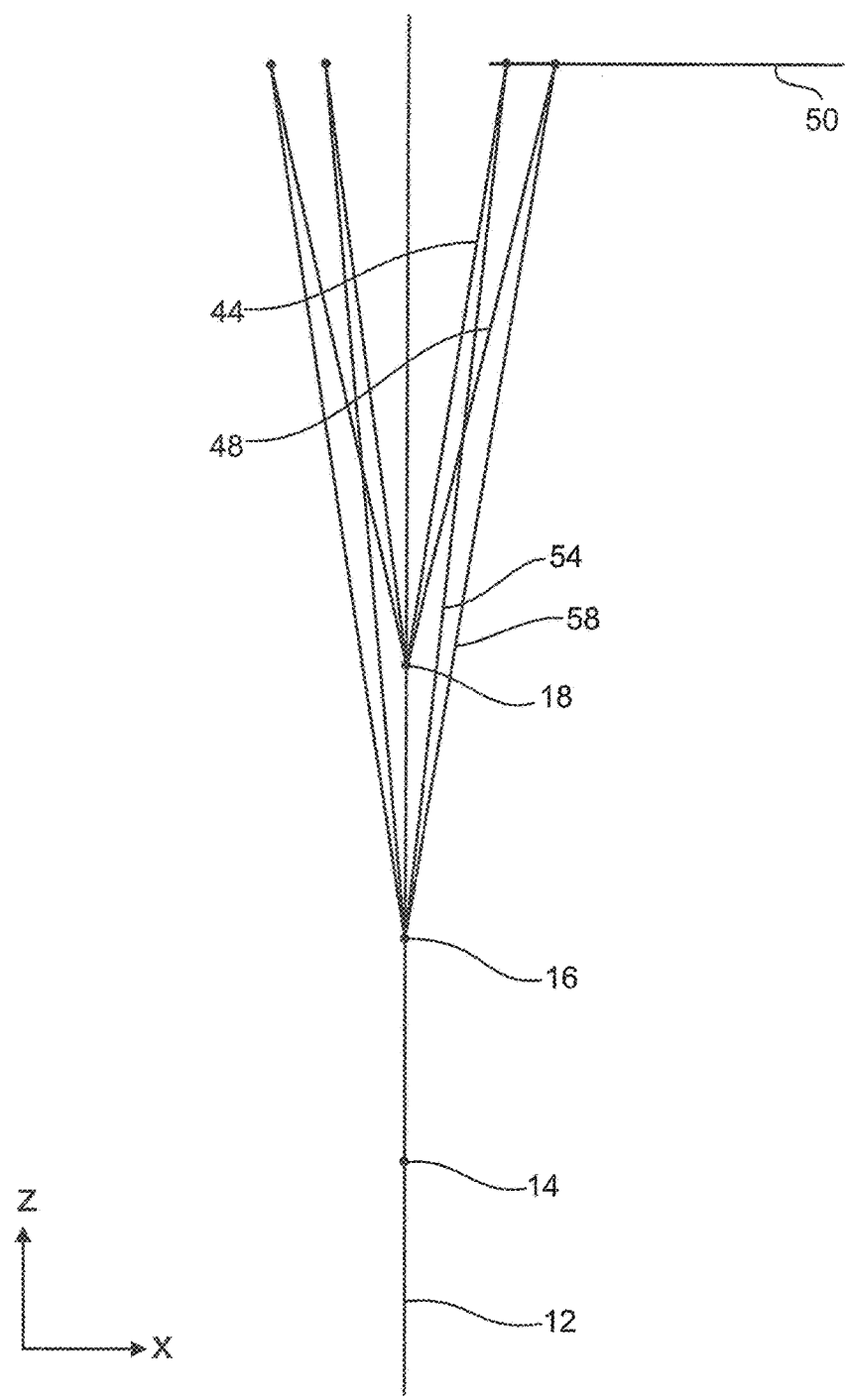
FIG. 2 is a representation of the prior art X-ray fan beam 12 and illustrating the effect of elevation of the voxel interaction with the X-ray on deflection cone widths.
Figure 3:
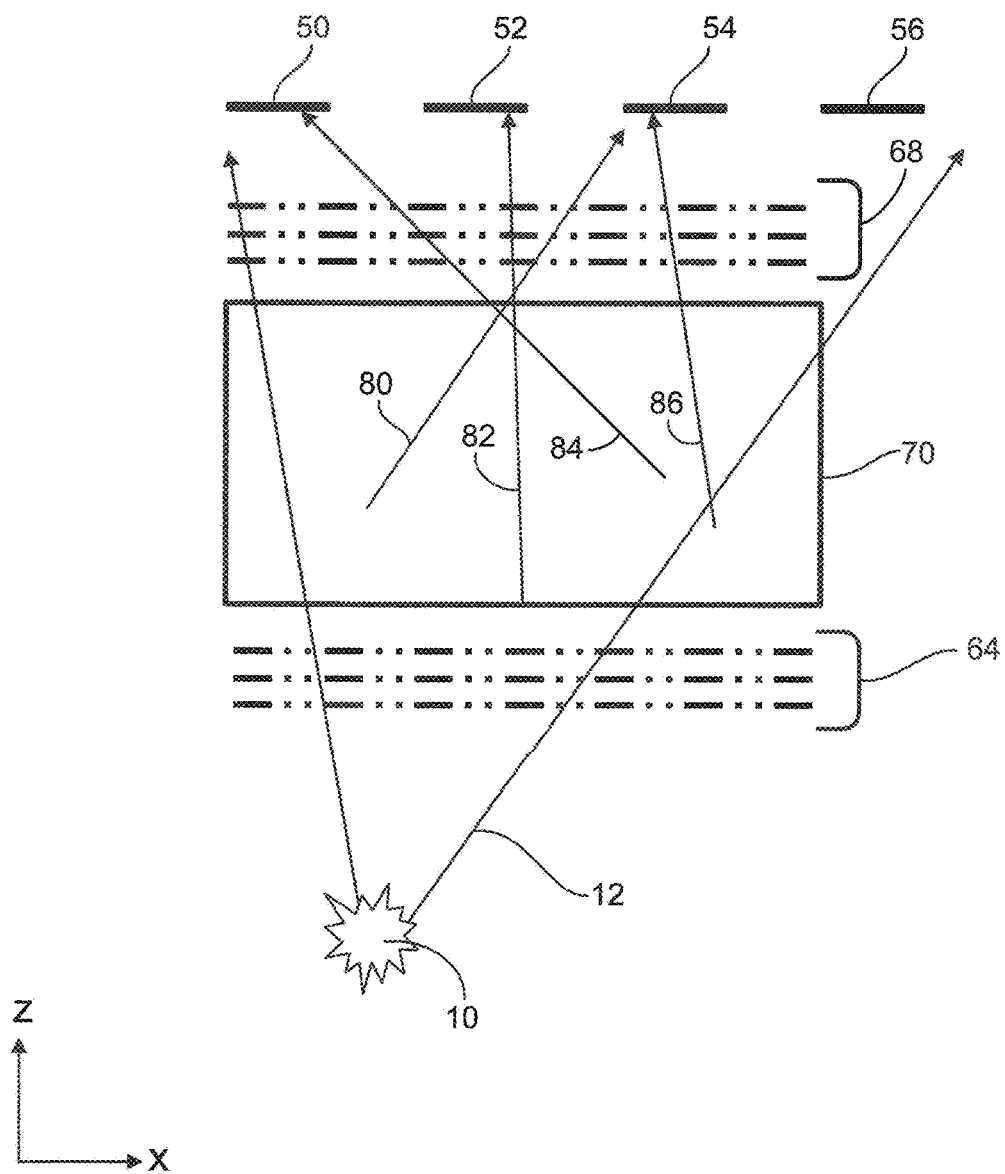
FIG. 3 shows a set of components known in the prior art to help illustrate additional concepts of X-ray scatter.
Figure 4:
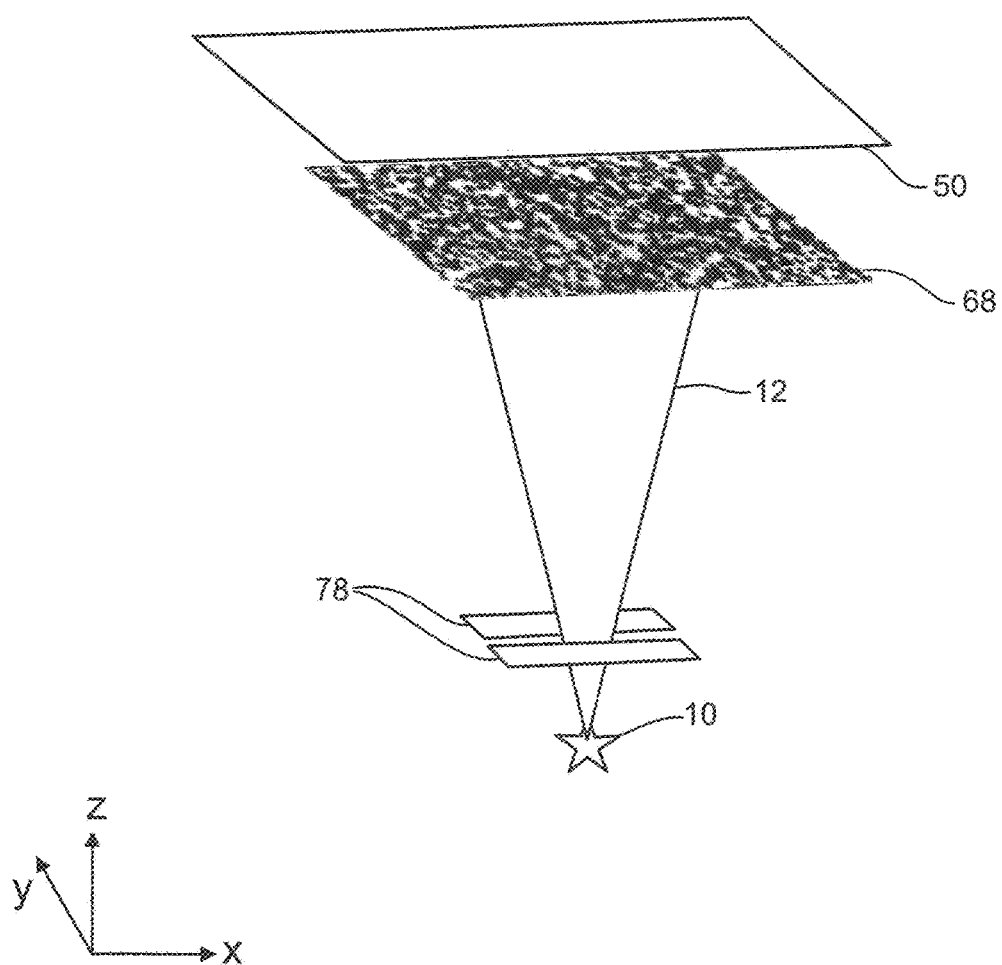
FIG. 4 is a different representation of the key components in an X ray scatter detection system as known in the prior art including the plates to form the fan beam 12.

The conveyor belt 304 carries the suitcase 390 out of the CT scanner 310 and into a tunnel for a coherent scatter scanner 320 that is created based on the teachings of the present disclosure. An X-ray fan beam oriented perpendicular to the direction of travel of the conveyor belt 304 strikes the suitcase 390 to cause coherent scatter events as the X-rays hit different materials at different X and Z positions within the slice of the suitcase 390 in line with fan beam (element 12 FIG. 2). As the suitcase 390 is not repositioned on the conveyor belt 304 between the outlet of CT scanner 310 and the inlet of coherent scatter scanner 320, the 3D model of the suitcase 390 is used in collaboration with the data collected by a set of at least two X-ray detector modules that are shielded at least partially from Compton scatter by angle limiting elements placed on the detector side of the suitcase 390. While not every voxel of the suitcase 390 will lead to coherent scatter that strikes a particular X-ray detector module, the data from the set of at least two X-ray detector modules is combined to reduce the number of voxels that have no data.

Any object which was identified by the CT scanner 310 as having a contiguous set of voxels with substantially the same density estimate can be associated with a FORM FACTOR by the coherent scatter scanner 320 as long as the coherent scatter scanner 320 collects sufficient data to obtain a FORM FACTOR for at least one voxel in the set of many voxels that make up that object. This concept was illustrated by the identification of item 204 in FIG. 19 and FIG. 22 even though most but not all voxels of object 206 were in a coherent scanner blind spots zone 148 (FIG. 22).

FIG. 27.

Figure 27:
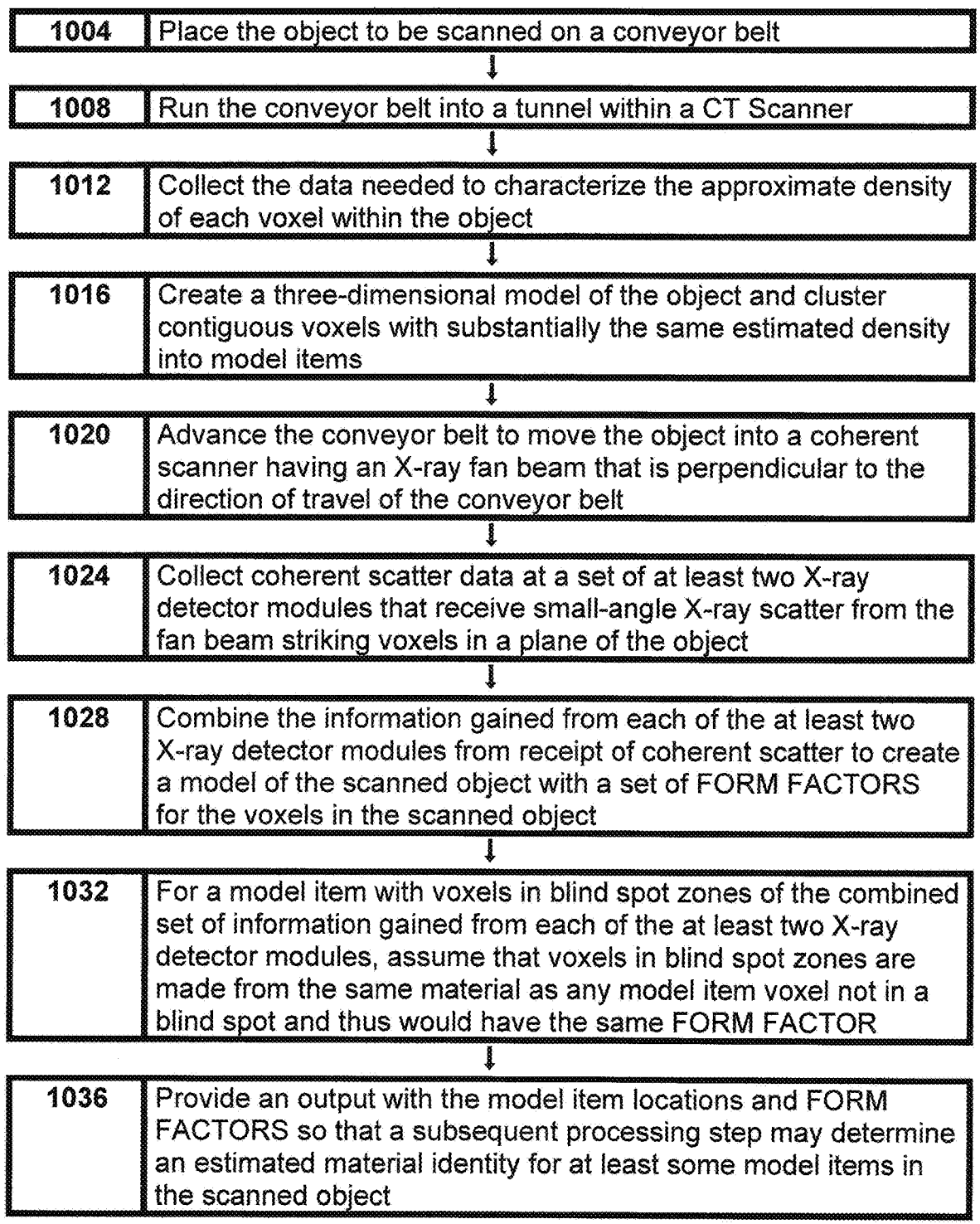
FIG. 27 sets for a process 1000 for obtaining FORM FACTOR information for a set of voxels in a scan object.

FIG. 27 sets for a process 1000 for obtaining FORM FACTOR information for a set of voxels in a scan object.

Step 1004 place the object to be scanned on a conveyor belt.

Step 1008 run the conveyor belt into a tunnel within a CT Scanner.

Step 1012 as the object moves though the CT Scanner, collect the data needed to characterize the approximate density of each voxel within the object.

Step 1016 create a three-dimensional model of the object and cluster contiguous voxels with substantially the same estimated density into model items which are assumed to be made of one substance. The term substance includes a substantially homogenous mixture of materials as was shown in item 220 that was a 20/80 mix of methanol and water. As noted below, there are options for substituting other sources of information for a CT Scanner in order to decide how to cluster contiguous voxels into model items. The common characteristic may be something other than density.

Step 1020 advance the conveyor belt to move the object into a coherent scanner having an X-ray fan beam that is perpendicular to the direction of travel of the conveyor belt. Ideally, this can be done without changing the position of the object on the conveyor belt, Step 1024 Collect coherent scatter data at a set of at least two X-ray detector modules that receive small-angle X-ray scatter from the fan beam striking voxels in a plane of the object. Each X-ray detector module being at least partially shielded from Compton scatter X-rays by angle limiting elements that are substantially X-ray absorbing for the energy level of X-rays used in this coherent scanner. The angle limiting elements allow in a greater range of angles than a collimator that limits angles of deviation severely. The upper end of the angles allowed to pass through the angle limiting elements may have an upper end of eleven degrees so that the field of view of the detector module exceeds 10 degrees.

As noted above, the angle limiting elements that are substantially X-ray absorbing for the energy level of X-rays used in this coherent scanner. To clarify on this use of substantially—those of skill in the art appreciate that even highly attenuating materials such as lead do not absorb absolutely all X-rays that hit the lead barrier. However, an appropriate material of appropriate thickness for the energy level of the X-ray will absorb such a high percentage of X-rays that it is treated by those of skill in the art as a total barrier. The angle limiting elements will be constructed to block above 95 percent of the X-rays that contact the angle limiting elements. In many instances the angle limiting elements will be constructed to block more than 99 percent of the X-rays within the expected energy level band that contact the angle limiting elements.

Step 1028 Combine the information gained from each of the at least two X-ray detector modules from receipt of coherent scatter to create a model of the scanned object with a set of FORM FACTORS for the voxels in the scanned object.

Step 1032—For a model item with voxels in blind spot zones of the combined set of information gained from each of the at least two X-ray detector modules, assume that voxels in blind spot zones are made from the same material as any model item voxel not in a blind spot and thus would have the same FORM FACTOR.

Step 1036—Provide an output with the model item locations and FORM FACTORS so that a subsequent processing step may determine an estimated material identity for at least some model items in the scanned object.

Alternatives and Variations

Location of X-ray beam sources and X-ray detector modules.

In order to make the document easy to read and understand, the X-ray source was shown as consistently below the conveyor belt in the tunnel and the X-ray detector modules were consistently above the scanned object. This consistency is not to be confused with a limitation. The X-rays rather than moving upward in the Z dimension, could move downward in the Z dimension. Likewise, the X-rays could move across the conveyed object from left to right or right to left.

Orientation of the Fan Beam Versus Direction of Travel.

In the embodiment described above, the scan object such as a suitcase travels on a conveyor belt in a Y direction and is struck by a fan beam 12 that strikes X-Z slices of the scan object. This is a viable implementation and the one that lends itself to teaching the concepts to others. Those of skill in the art will appreciate that the teachings of this disclosure do not require that the fan beam be perpendicular to the direction of travel of the scan object. For example, the fan beam could be rotated from the X-Z plane in the Y direction towards an oncoming scan object so that the fan beam strikes a top portion of the scan object before striking other portions of the scan object. Likewise, the fan beam could be rotated from the X-Z plane in the Y direction away from an oncoming scan object so that the fan beam strikes a lower portion of the scan object before striking other portions of the scan object. The tilting of the fan beam would not have to be solely in the Y direction. The fan beam could be rotated from the X-Z plane. This may be done in combination with movement in the Y direction. All that is needed is that the fan beam strike enough of the scan object so that any items of interest may have at least some voxels provide sufficient data to create a FORM FACTOR.

Repositioning of the Scan Object.

In a preferred embodiment, the scan object moves through a first scanner and a second scanner without repositioning as this reduces some of the computations needed to map one set of voxels from a first scanner onto a second set of voxels from a second scanner. While desirable, this is not a requirement to use the teachings of the present disclosure. One of skill in the art would be able to map voxels from the first scanner to voxels on the second scanner even if the scan object (such as a suitcase) was repositioned between the first scanner or the second scanner. The same issue arises where one of the scanners is replaced by a scan item manifest that is used to create a voxel model of the scan item to be combined with the voxel FORM FACTORS of the coherent scatter scanner.

Type of X-Ray Detector Modules

The teachings of the present disclosure can be used with a range of different X-ray Detector Modules. Spectroscopic X-ray detector modules may be used that obtain the X-ray energy level of X-rays that strike the X-ray detector module to help segregate the data by X-ray energy level. However, this is not required. The data used for the various computer-generated results came from a narrow band of X-ray energy levels. This could be done by using an unfiltered X-ray source for the fan beam and then only using X-ray information collected at a spectroscopic X-ray detector within a specified energy band. But it could also be done by using a non-spectroscopic X-ray detector and using energy level filters to limit the X-rays to a narrowed band of energy levels. CMOS detectors, photon-counting detectors, or energy-resolving detectors are all viable design choices for using the teachings of the present disclosure.

Those of skill in the art would be able to work with photon counting X-ray detector modules or energy integrating X-ray detector modules.

Size of the Tunnel.

In order to provide examples of the system, some of the graphs included dimensions. These dimensions are to provide context and are not limiting. Those of skill in the art will appreciate that a baggage inspection tunnel may be scaled to various sizes depending on the intended use. A scanner for carryon luggage may be scaled to have a tunnel in the range of 60 cm by 40 cm. A scanner for checked baggage may be scaled to have a tunnel in the range of 60 cm by 100 cm. A scanner for use with parcels or cargo may be scaled to have a tunnel in the range of 100 cm by 100 cm. Those of skill in the art could scale the teachings of the present disclosure to scan even larger or smaller object.
Use of a Single X-Ray Detector Module.

In FIG. 18, the single X-ray detector module 50 of FIG. 5 was replaced by several distinct X-ray detector modules 50, 52, and 54. While this is a prudent arrangement given that X-ray detector modules are expensive and the expense is largely driven by the total area of the X-ray detector modules in the system, prudence is not the same absolutely required. One could use the elongated X-ray detector module of FIG. 5 and obtain the results shown in the modeled results of FIG. 19 by adding the blocking plate 120 of FIG. 18.
Order of Scanning Devices.

FIG. 26 shows a suitcase 390 passing through CT scanner 310 before passing through coherent scatter scanner 320. This sequence would allow the CT scanner model of the suitcase 304 to be built before the suitcase 390 reaches the coherent scatter scanner 320. While this sequence is logical and perhaps optimal, one of skill in the art will appreciate that one could move a suitcase through a coherent scatter scanner 320 and then move the suitcase through the CT scanner 310 and combine the two sets of data shortly thereafter.
Alternatives to a CT Scanning Device.

The teachings of the present disclosure work with a three-dimensional model of the scan object 70 such as suitcase. The three-dimensional model aggregates voxels having the same properties and makes them into objects 290. There are a variety of types of CT scanners that can create suitable three-dimensional models of the scan object 70. Some CT scanners such as dual-energy CT scanners, include an estimated atomic number of the material at a particular voxel. Other types of scanners known to those of skill in the art such as an ultrasound scanner, and MRI scanner can also create a usable three-dimensional model for use with the teachings of the present disclosure. A conventional transmission imaging system may be used to form an approximate model.

The three-dimensional model could come from a manifest document for the scan object 70 if the manifest was sufficiently detailed. The teachings of the present disclosure are agnostic on the source of the three-dimensional model of the contents of the scan object 70 including identification of items of interest for aggregating voxels as model items that are assumed to have the same material in each voxel.
Alternatives to a Conveyor Belt.

The disclosure consistently referenced a conveyor belt as this is one viable solution for advancing the scan object 70 such as a suitcase or other scanned object through the coherent scatter scanner. Those of skill in the art will appreciate that other tools may be used to advance a scan object through a scanner. The use of a translation stage is one common solution. A scan object on a cart could be pushed or pulled through the coherent scatter scanner using a push rod or a rope.
A Tunnel is not Required.

The disclosure references advancing the scan object through a tunnel in a scanner as this is a common arrangement of components. However, nothing in this disclosure requires a closed top to the scanner so the scan object would not necessarily pass through a tunnel.
Used of Coded Apertures.

Another common tool used in the field of X-ray scanners is a coded aperture. The teachings of the present disclosure do not require the use of a coded aperture to help disambiguate the incoming coherently scattered X-rays. However, the teachings of the present disclosure do not preclude the use of coded-apertures and this tool may be useful in some applications. FIG. 18 includes a coded-aperture 124 and a coded-aperture 124 was used in the model that led to some of the data presented in this disclosure.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of determining estimated coherent scatter form factors for at least some model items (204, 208, 212, 216, 220) within a scan object (70, 200, 390), the method comprising:
 advancing the scan object in a Y direction through a coherent scatter scanner (320);
 exposing a series of slices of the scan object to an X-ray fan beam (12) that is in a fixed location within the coherent scatter scanner and oriented perpendicular to the Y direction of travel of the scan object;
 capturing coherent scatter data at a set of at least two X-ray detector modules (50, 52, 54, 56) wherein:
  each X-ray detector module in a fixed position relative to the coherent scatter scanner;
  each X-ray detector module limited to a small-angle field of view of not more than 15 degrees in a direction parallel to a plane containing the X-ray fan beam by at least one detector-side angle limiting element (104, 106, 108, 120); and
  at least two of the set of at least two X-ray detector modules are positioned on a first side of the X-ray fan beam, with each of set of at least two-X-ray detector modules on the first side of the X-ray fan beam seeing diffractions from different portions (150, 152, 154, 160, 162) of the X-ray fan beam; and
 combining the coherent scatter data from the at least two x-ray detector modules with a separate model of aggregate items that clusters sets of voxels in the scan object into model items to map estimated material coherent scatter form factors to at least some model items (204, 208, 212, 216, 220).

2. The method of claim 1 determining estimated coherent scatter form factors for at least some model items (204, 208, 212, 216, 220) wherein the separate model of aggregate items that clusters sets of voxels in the scan object into model items to generate estimated material coherent scatter form factors for at least some model items (204, 208, 212, 216, 220) is created by advancing the scan object in a Y direction through a CT scanner (310) wherein the CT scanner creates the separate model of aggregate items based on a set of property estimates for a set of voxels in the scan object before aggregating contiguous voxels with substantially identical property estimates into model items (204, 208, 212, 216, 220).

3. The method of claim 1 determining estimated coherent scatter form factors for at least some model items (204, 208, 212, 216, 220) wherein the separate model of aggregate items that clusters sets of voxels in the scan object into model items to generate estimated material coherent scatter form factors for at least some model items (204, 208, 212, 216, 220) operates for voxels in on of a set of blind spots (148) by concluding that any voxel in one of the set of blind spots that is part of a particular model item that is only partially in one of the set of blind spots has a same material type as portions of the individual model items (204, 208, 212, 216, 220) within the scan object (70, 200, 390) not in one of the set of blind spots.

4. The method according to claim 1 wherein exposing the series of slices of the scan object to the X-ray fan beam that is in a fixed location exposes X-Z slices of the scan object.

5. The method according to claim 1 wherein a first small-angle field of view (112) perpendicular to a plane containing the X-ray fan beam is greater than a second small-angle field of view (116) that is parallel to the plane containing the X-ray fan beam.

6. The method of claim 5 wherein the first small-angle field of view includes up to degrees.

7. The method of claim 2 wherein the scan object passes through the CT scanner before passing through the coherent scatter scanner.

8. The method of claim 2 wherein the scan object passes through the CT scanner after passing through the coherent scatter scanner.

9. The method of claim 2 wherein the property estimates are estimates of density.

10. The method according to claim 1 wherein a first voxel size used in the coherent scatter data is not equal to a model voxel size used in the separate model of aggregate items that clusters sets of voxels in the scan object into model items.

11. The method according to claim 1 wherein the scan object moving in the Y direction through the coherent scatter scanner also moves through an ultrasound scanner and the ultrasound scanner creates a set of property estimates for a set of voxels in the scan object before aggregating contiguous voxels with substantially identical property estimates into model items.

12. The method according to claim 1 wherein the separate model of aggregate items that clusters sets of voxels in the scan object into model items is a detailed three-dimensional manifest of what is in the scan object.

13. The method according to claim 1 wherein each X-ray detector module limited to the small-angle field of view by at least one detector-side angle limiting element that is an X-ray absorbing blinder (106, 108) to limit a range of angles of X-ray paths that can reach each of the X-ray detector modules.

14. The method according to claim 1 wherein each X-ray detector module is limited to the small-angle field of view by at least one detector-side angle limiting element that is a blocking plate (120) with a single opening (122) that allows X-rays within the small-angle field of view to reach the X-ray detector module while absorbing substantially all X-rays from angles beyond an upper limit for the small-angle field of view.

15. The method according to claim 1 wherein each X-ray detector module uses energy-resolving detectors and the scan object is exposed to a polychromatic X-ray fan beam.

16. The method according to claim 1 wherein the scan object is exposed to a partially monochromatic X-ray fan beam.

17. The method according to claim 1 further comprising a subsequent processing step using the mapped estimated material coherent scatter form factors to determine an estimated material identity for at least some model items in the scanned object.

18. A method of determining estimated coherent scatter form factors for at least some model items (204, 208, 212, 216, 220) within a scan object (70, 200, 390), the method comprising:
   advancing the scan object in a Y direction through a coherent scatter scanner (320);
   exposing a series of slices of the scan object to an X-ray fan beam (12) that is in a fixed location within the coherent scatter scanner and oriented perpendicular to the Y direction of travel of the scan object;
   capturing coherent scatter data at a set of at least two X-ray detector modules (50, 52, 54, 56) wherein:
   each X-ray detector module in a fixed position relative to the coherent scatter scanner;
   each X-ray detector module limited to a small-angle field of view of not more than 15 degrees in a direction parallel to a plane containing the X-ray fan beam by at least one detector-side angle limiting element (104, 106, 108, 120); and
   at least two of the set of at least two X-ray detector modules are positioned on a first side of the X-ray fan beam, with each of set of at least two-X-ray detector modules on the first side of the X-ray fan beam seeing diffractions from different portions (150, 152, 154, 160, 162) of the X-ray fan beam; and
   combining the coherent scatter data from the at least two x-ray detector modules with a separate model of aggregate items that clusters sets of voxels in the scan object into model items to map estimated material coherent scatter form factors to individual voxels in at least some model items (204, 208, 212, 216, 220); and
   assuming that any voxel in a blind spot (148) that does not receive coherent scatter data from the least two x-ray detector modules has the same coherent scatter form factors as other voxels not in a blind spot within the same model item as the voxel in the blind spot.

19. The method according to claim 18 further comprising a subsequent processing step using the mapped estimated material coherent scatter form factors to determine an estimated material identity for at least some model items in the scanned object.

* * * * *

UNITED STATES PATENT AND TRADEMARK OFFICE
CERTIFICATE OF CORRECTION

PATENT NO. : 12,360,064 B1
APPLICATION NO. : 19/066471
DATED : July 15, 2025
INVENTOR(S) : Greenberg et al.

Page 1 of 1

It is certified that error appears in the above-identified patent and that said Letters Patent is hereby corrected as shown below:

In the Claims

Column 23, Line 38, Claim 6 'up to degrees' should read -up to 25 degrees-.

Signed and Sealed this
Nineteenth Day of August, 2025

Coke Morgan Stewart
*Acting Director of the United States Patent and Trademark Office*